(12) United States Patent
Kang et al.

(10) Patent No.: US 11,556,977 B2
(45) Date of Patent: Jan. 17, 2023

(54) ELECTRONIC DEVICE AND METHOD FOR CONTROLLING EXTERNAL ELECTRONIC DEVICE

(71) Applicant: Samsung Electronics Co., Ltd., Gyeonggi-do (KR)

(72) Inventors: Doosuk Kang, Gyeonggi-do (KR); Seungnyun Kim, Gyeonggi-do (KR); Bokun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/043,224

(22) PCT Filed: May 20, 2019

(86) PCT No.: PCT/KR2019/006024
§ 371 (c)(1),
(2) Date: Sep. 29, 2020

(87) PCT Pub. No.: WO2019/225927
PCT Pub. Date: Nov. 28, 2019

(65) Prior Publication Data
US 2021/0019817 A1    Jan. 21, 2021

(30) Foreign Application Priority Data
May 25, 2018  (KR) .................. 10-2018-0059760

(51) Int. Cl.
*H04W 8/00* (2009.01)
*G06K 7/10* (2006.01)
(Continued)

(52) U.S. Cl.
CPC ..... *G06Q 30/0641* (2013.01); *G06K 7/10366* (2013.01); *G06Q 20/326* (2020.05);
(Continued)

(58) Field of Classification Search
CPC ........... G06Q 30/0641; G06Q 30/0623; G06Q 30/0633; G06Q 20/202; G06Q 20/3278;
(Continued)

(56) References Cited

U.S. PATENT DOCUMENTS

2001/0025392 A1* 10/2001  Youn ................. D06F 34/28
                                                68/12.02
2005/0222859 A1* 10/2005  Ha ..................... G06Q 20/10
                                                705/39
(Continued)

FOREIGN PATENT DOCUMENTS

CN       105550918 A       5/2016
KR   10-2014-0122108 A    10/2014
(Continued)

OTHER PUBLICATIONS

European Search Report dated Mar. 24, 2021.
Korean Examination Report dated Nov. 30, 2022.

*Primary Examiner* — Caroline H Jahnige
*Assistant Examiner* — Hassan A Khan
(74) *Attorney, Agent, or Firm* — Cha & Reiter, LLC

(57) ABSTRACT

An electronic device according to various embodiments of the present invention may include an antenna module configured to sense an electromagnetic (EM) signal generated from an external electronic device, a communication module, a processor operatively connected to the antenna module and the communication module, and a memory storing instructions which, are configured to, when executed, cause the processor to identify the external electronic device based on at least part of the EM signal sensed from the external electronic device via the antenna module, identify whether the identified external electronic device is registered in a designated control application, and provide information related to the external electronic device based on whether (Continued)

the external electronic device is registered. In addition, other various embodiments of the present invention may be possible.

10 Claims, 16 Drawing Sheets

(51) Int. Cl.
*G06Q 30/06* (2012.01)
*G06Q 20/20* (2012.01)
*H04W 4/50* (2018.01)
*H04W 60/04* (2009.01)
*G06Q 20/32* (2012.01)

(52) U.S. Cl.
CPC ..... *G06Q 30/0623* (2013.01); *G06Q 30/0633* (2013.01); *H04W 4/50* (2018.02); *H04W 8/005* (2013.01); *H04W 60/04* (2013.01); *G06Q 20/202* (2013.01); *G06Q 20/3278* (2013.01)

(58) Field of Classification Search
CPC ....... H04W 4/50; H04W 8/005; H04W 60/04; G06K 7/10366
See application file for complete search history.

(56) References Cited

U.S. PATENT DOCUMENTS

| | | | | |
|---|---|---|---|---|
| 2007/0200870 A1* | 8/2007 | Jeong | | D06F 34/32 345/619 |
| 2009/0305665 A1* | 12/2009 | Kennedy | | H04L 63/0876 455/410 |
| 2010/0011609 A1* | 1/2010 | Park | | D06F 29/00 34/88 |
| 2012/0109384 A1* | 5/2012 | Stepanian | | H04N 21/42201 700/275 |
| 2013/0198813 A1* | 8/2013 | van Roermund | | H04L 12/2807 726/4 |
| 2013/0281155 A1* | 10/2013 | Ogata | | H04B 1/3883 455/556.1 |
| 2014/0156082 A1* | 6/2014 | Ha | | H04L 12/2818 700/275 |
| 2014/0195383 A1* | 7/2014 | Kim | | G06F 3/04883 705/26.8 |
| 2014/0236328 A1* | 8/2014 | Kamon | | D06F 33/37 700/90 |
| 2014/0300450 A1* | 10/2014 | Ha | | H04B 5/0031 340/10.5 |
| 2015/0074554 A1* | 3/2015 | Sasaki | | H04L 12/1813 715/753 |
| 2015/0222632 A1* | 8/2015 | Ichijo | | G06F 21/30 726/7 |
| 2015/0350914 A1* | 12/2015 | Baxley | | H04W 72/0453 726/11 |
| 2015/0358337 A1* | 12/2015 | Keller | | H04W 12/128 726/23 |
| 2016/0098561 A1* | 4/2016 | Keller | | G06F 21/566 726/24 |
| 2016/0132821 A1* | 5/2016 | Glasgow | | G06Q 10/087 705/28 |
| 2016/0155443 A1* | 6/2016 | Khan | | G06F 3/147 704/275 |
| 2016/0173318 A1* | 6/2016 | Ha | | H04W 4/02 709/223 |
| 2016/0218884 A1* | 7/2016 | Ebrom | | H04L 12/2816 |
| 2017/0124816 A1* | 5/2017 | Yang | | H04M 1/725 |
| 2017/0205791 A1* | 7/2017 | Yang | | D06F 37/04 |
| 2017/0255930 A1* | 9/2017 | Lee | | G06Q 20/3274 |
| 2017/0270198 A1* | 9/2017 | Sample | | G06F 16/211 |
| 2018/0061222 A1* | 3/2018 | Pasztor | | H04N 21/42225 |
| 2018/0103080 A1* | 4/2018 | Girish | | H04L 65/80 |
| 2018/0173175 A1* | 6/2018 | Zhang | | G06Q 10/02 |
| 2018/0268469 A1* | 9/2018 | Shu | | G06Q 20/085 |
| 2019/0036914 A1* | 1/2019 | Tzur-David | | H04L 63/20 |
| 2019/0136433 A1* | 5/2019 | Yin | | D06F 34/18 |
| 2019/0138172 A1* | 5/2019 | Kim | | H04L 67/125 |
| 2019/0287153 A1* | 9/2019 | Shu | | G06Q 30/02 |
| 2020/0311799 A1* | 10/2020 | Bajovic | | G06K 7/1417 |
| 2021/0398054 A1* | 12/2021 | Jaggers | | G09B 7/02 |

FOREIGN PATENT DOCUMENTS

| KR | 10-2015-0035913 A | 4/2015 |
|---|---|---|
| KR | 10-2015-0038849 A | 4/2015 |
| KR | 10-2017-0125655 A | 11/2017 |

* cited by examiner

ELECTRONIC DEVICE AND METHOD FOR CONTROLLING EXTERNAL ELECTRONIC DEVICE

CROSS-REFERENCE TO RELATED APPLICATION(S)

This application is a National Phase Entry of PCT International Application No. PCT/KR2019/006024, which was filed on May 20, 2019 and claims priority to Korean Patent Application No. 10-2018-0059760, which was filed on May 25, 2018 in the Korean Intellectual Property Office, the contents of which are incorporated herein by reference.

BACKGROUND

1. Field

Various embodiments of the present invention relate to an electronic device and a method for controlling an external electronic device by using an electromagnetic (EM) signal.

2. Description of the Related Art

With development of information and communication technologies, various performances of electronic devices have been implemented. Various services such as device control, shopping, or payment may be provided via portable electronic devices such as a smart phone or a tablet computer, and in recent years, there is a trend of being advanced to provide customized services based on a user and an environment to which the user belongs.

Electronic devices may be connected via a wired/wireless network within a determined space, so the electronic devices may operate organically. For example, a portable electronic device may monitor and control states of home appliances connected via a network, and thus, a range for living facility control, energy management, or a security service may be extended.

Shopping using electronic devices has also become active. Various schemes have been proposed to provide functions required for shopping, such as product recommendation, order, or payment, as well as price comparison for a product which a user desires, and to enable the user to shop faster and more conveniently via an electronic device.

SUMMARY

For controlling another external electronic device by using an electronic device, a connection between the external electronic device to be controlled and the electronic device need to be established. For example, if an input/output function of the external electronic device is limited, the electronic device may search for the external electronic device or directly input a model name or a serial number of the corresponding external electronic device to establish the connection, so trouble may occur when establishing the connection.

For example, even when purchasing an electronic product by using the electronic device, a purchase procedure may proceed for the electronic product to be purchased after the electronic product is searched by inputting an exact name or model name of the electronic product or a barcode on the product is found and scanned and then the electronic product is identified in this manner. It is difficult for a user to know exact model names of most electronic products, and even if the user knows the model names, it may be difficult for the user to input complex and long model names.

Various embodiments of the present invention may provide an electronic device and a method for controlling an external electronic device for easily performing connection establishment and control with the external electronic device, and a purchase of the external electronic device or a product related to the external electronic device by using information of the external electronic device identified via electromagnetic (EM) signal sensing.

An electronic device according to various embodiments of the present invention may include an antenna module configured to sense an electromagnetic (EM) signal generated from an external electronic device, a communication module, a processor operatively connected to the antenna module and the communication module, and a memory storing instructions which, are configured to, when executed, cause the processor to identify the external electronic device based on at least part of the EM signal sensed from the external electronic device via the antenna module, identify whether the identified external electronic device is registered in a designated control application, and provide information related to the external electronic device based on whether the external electronic device is registered.

A method for controlling an external electronic device in an electronic device according to various embodiments of the present invention may include sensing an electromagnetic (EM) signal generated from an external electronic device, identifying the external electronic device based on at least part of the EM signal sensed from the external electronic device, identifying whether the identified external electronic device is registered in a designated control application, and providing information related to the external electronic device based on whether the external electronic device is registered.

A method for providing a purchase service related to an external electronic device in an electronic device according to various embodiments of the present invention may include running a designated payment application, sensing an electromagnetic (EM) signal generated from an external electronic device, identifying the external electronic device based on at least part of the EM signal sensed from the external electronic device, identifying purchase-related information related to the external electronic device, and providing the purchase-related information related to the external electronic device.

An electronic device and method according to various embodiments may easily and conveniently perform control for an external electronic device by recognizing the external electronic device by using an EM signal which occurs from the external electronic device, and providing information for controlling the recognized external electronic device.

According to various embodiments, a sensing function for an EM signal may be used upon purchasing an electronic product or a product related to the electronic device, thereby a purchase procedure for an electronic product may be more simplified and user convenience may be improved.

DETAILED DESCRIPTION

Figure 1:
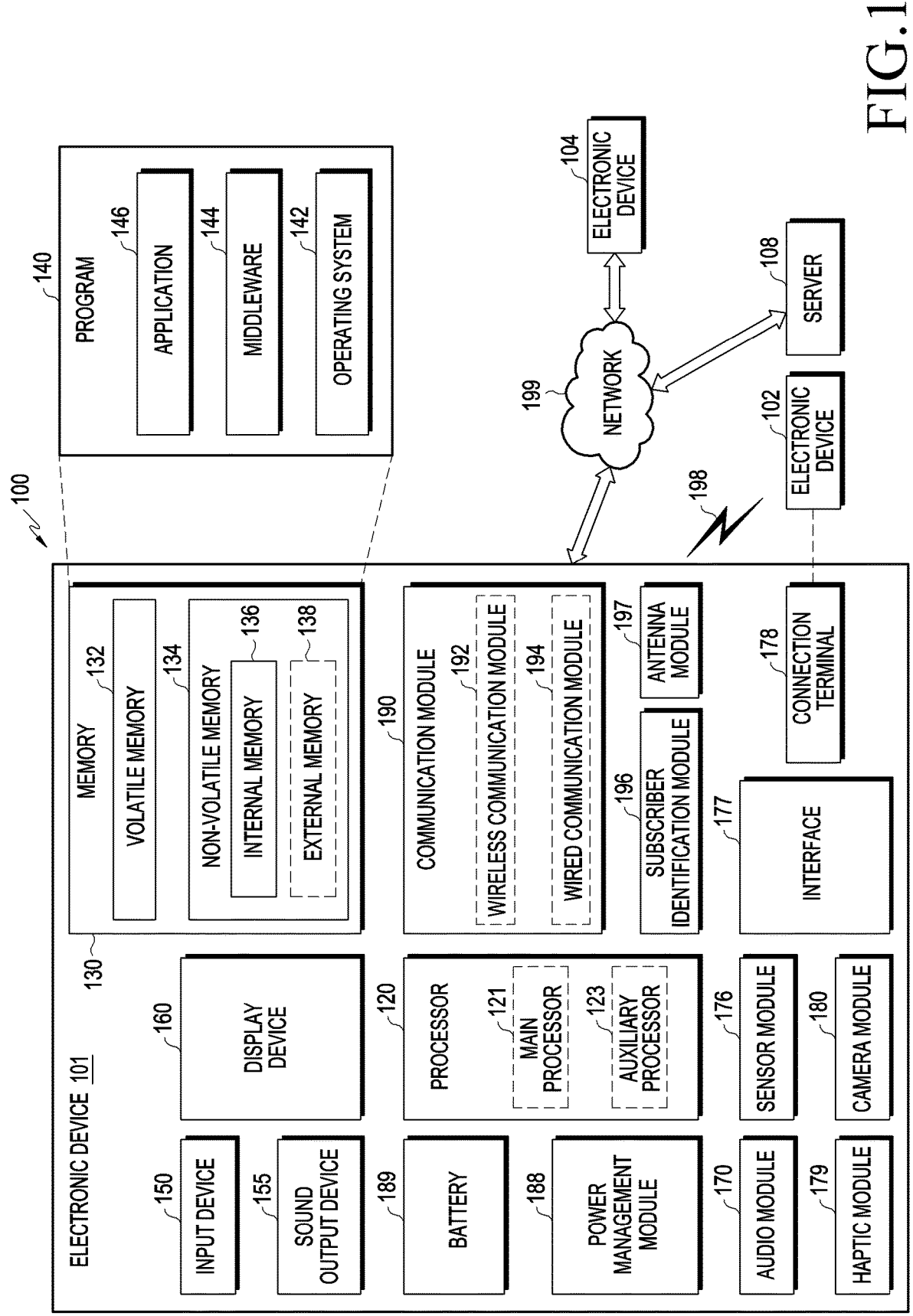
FIG. 1 is a diagram illustrating an electronic device in a network environment according to various embodiments of the present invention.

Hereinafter, various embodiments of the present invention are described with reference to accompanying drawings. However, it should be appreciated that the present invention is not limited to specific embodiments, and all changes and/or equivalents or alternatives thereto also belong to the scope of the present invention. Similar reference denotations may be used to refer to similar components throughout the specification and the drawings.

As used herein, the terms "have," "may have," "include," or "may include" a feature (e.g., a number, a function, an operation, or a component such as a part) indicate existence of the feature and do not exclude existence of other features.

As used in this document, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used in various embodiments, the terms "first" and "second" may modify various components regardless of an order and/or importance and do not limit the components. These terms may be used to distinguish one component from another. For example, a first user device and a second user device may indicate different user devices from each other regardless of an order or importance of the devices. For example, a first component may be referred to as a second component, and vice versa without departing from the scope of the present invention.

It will be understood that when a component (e.g., a first component) is referred to as being (operatively or communicatively) "coupled with/to," or "connected with/to" another component (e.g., a second component), it may be coupled or connected with/to the other component directly or via a third component. In contrast, it will be understood that when a component (e.g., a first component) is referred to as being "directly coupled with/to" or "directly connected with/to" another component (e.g., a second component), no other component (e.g., a third component) intervenes between the component and the other component.

As used in this document, the terms "configured (or set) to" may be interchangeably used with the terms "suitable for," "having the capacity to," "designed to," "adapted to," "made to," or "capable of" depending on a circumstance. The term "configured (or set) to" does not essentially mean "specifically designed in hardware to." Rather, the term "configured to" may mean that a device may perform an operation together with another device or parts. For example, the term "processor configured (or set) to perform A, B, and C" may mean a generic-purpose processor (e.g., a CPU or an application processor) which may perform corresponding operations by executing one or more software programs stored in a memory device or a dedicated processor (e.g., an embedded processor) for performing the corresponding operations.

The terms as used in this document are used merely to describe specific embodiments, but not to limit the scope of other embodiments. It is to be understood that the singular forms may include plural forms unless the context clearly dictates otherwise. All terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined in this document. In some cases, the terms defined in this document may not be interpreted to exclude embodiments of the present invention.

An electronic device according to various embodiments of the present invention may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to some embodiments, the electronic device may be a smart home appliance. The smart home appliance may include, for example, at least one of a television, a digital video disk (DVD) player, an audio player, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a gaming console (e.g., Xbox™, and PlayStation™), an electronic dictionary, an electronic key, a camcorder, or an electronic picture frame.

According to other embodiments, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to some embodiments, the electronic device may at least one of part of a piece of furniture or building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device according to an embodiment of the present disclosure is not limited to the above-listed devices, and may include new electronic devices depending on development of technology.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
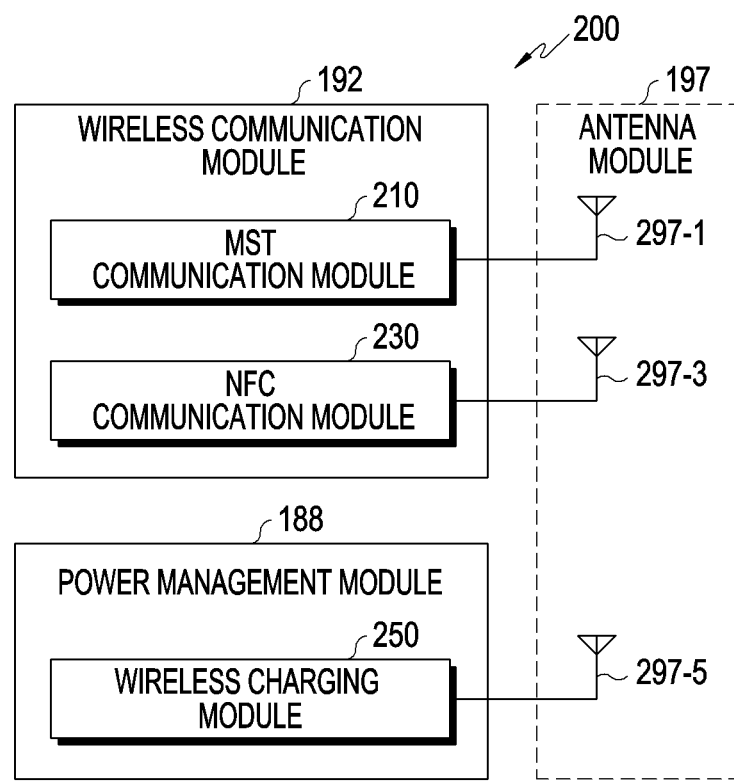
FIG. 2 is a diagram illustrating a wireless communication module, a power management module, and an antenna module of an electronic device according to various embodiments of the present invention.

FIG. 2 is a block diagram 200 illustrating the wireless communication module 192, the power management module 188, and the antenna module 197 of the electronic device 101 according to various embodiments. Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via a second network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g., open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing to the designated area or an application being executed in the TEE.

Figure 3A:
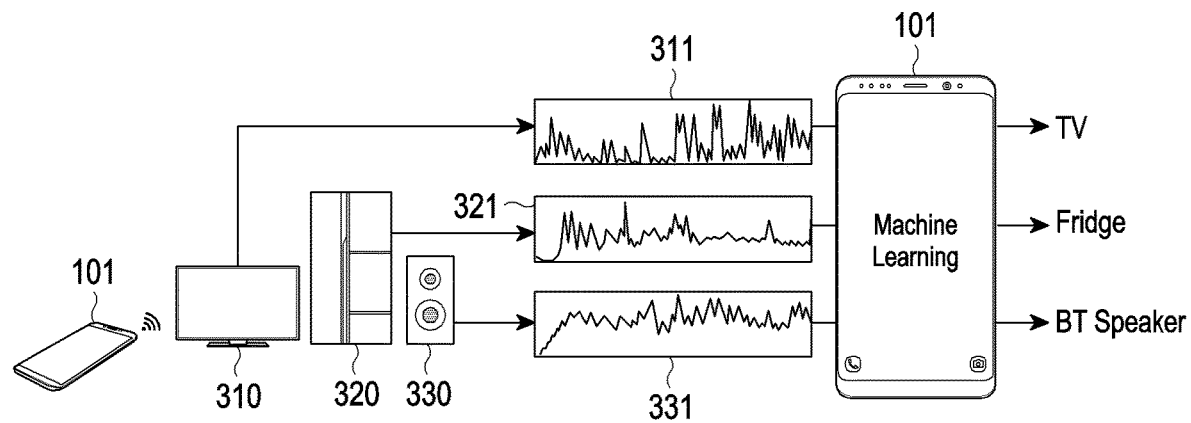
FIG. 3a is a diagram illustrating an example of an EM signal sensing scheme according to various embodiments of the present invention.
Figure 3B:
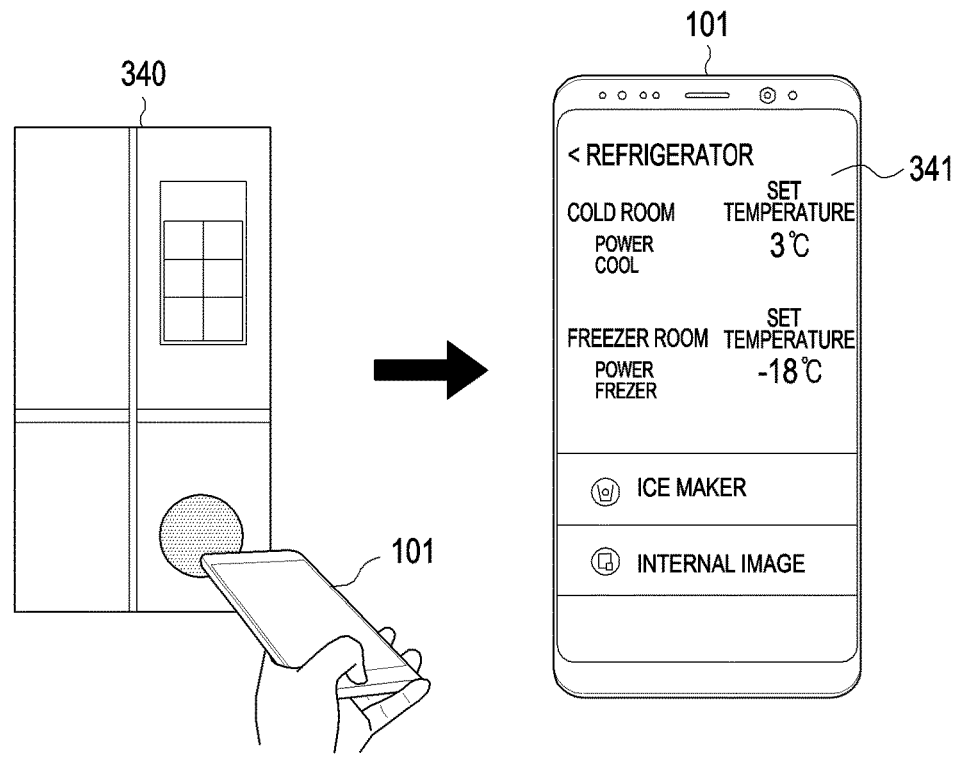
FIG. 3b is a diagram illustrating an example of information related to an external electronic device provided by using EM signal sensing according to various embodiments of the present invention.
Figure 3C:
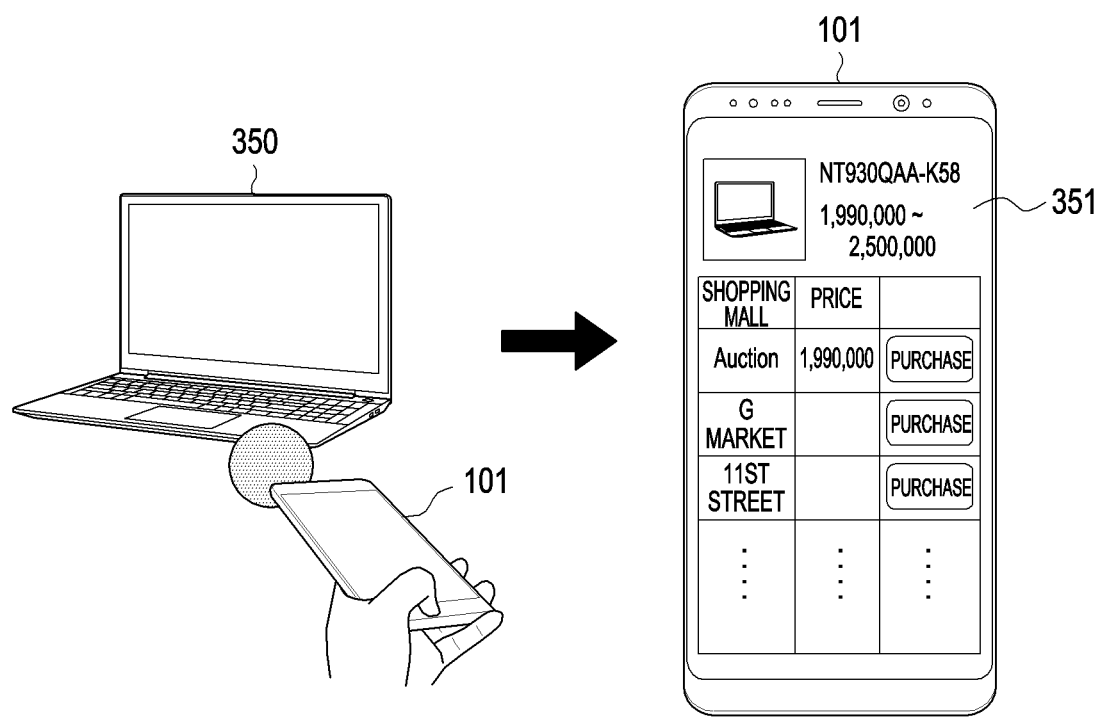
FIG. 3c is a diagram illustrating an example of information related to an external electronic device provided by using EM signal sensing according to various embodiments of the present invention.

FIG. 3a is a diagram illustrating an example of an EM signal sensing scheme according to various embodiments of the present invention. FIGS. 3b and 3c are diagrams illustrating an example of information related to an external electronic device provided by using EM signal sensing according to various embodiments of the present invention.

Referring to FIG. 3a, a plurality of external electronic devices 310, 320, and 330 may be disposed around an electronic device 101. For example, these external electronic devices 310, 320, and 330 may include a TV, a refrigerator, and a Bluetooth speaker. According to various embodiments of the present invention, the external electronic devices 310, 320, and 330 may include various electronic components, and generate various electromagnetic (EM) signals which are caused by electromagnetic interference (EMI) generated from the electronic components.

If the electronic device 101 is in contact with one of the plurality of external electronic devices 310, 320, and 330 or approaches the one of the plurality of external electronic devices 310, 320, and 330 within a determined distance while a function related to EM signal sensing is activated, the electronic device 101 may detect a unique frequency according to EM interference generated from the corresponding external electronic devices 310, 320, and 330. The electronic device 101 may analyze at least part of the detected frequency via machine learning and recognize a corresponding external electronic device based on a characteristic of the analyzed frequency. For example, if corresponding unique frequencies 311, 321, and 331 of 1 MHz or less among EM noise generated from the corresponding external electronic device are extracted as an EM signal, the extracted EM signal may be analyzed by a classifier stored in the electronic device 101, or may be transmitted to an external server for EM signal analysis. The classifier may identify the external electronic devices 310, 320, and 330 which correspond to the extracted EM signal by referring to a frequency table stored in a memory (e.g., a memory 130 in FIG. 1). The frequency table may previously store unique frequencies which correspond to various external electronic devices and a model name or a device type of an external electronic device corresponding thereto. The classifier may be continuously learned and updated by using a machine learning algorithm in order to improve recognition accuracy for the external electronic devices 310, 320, and 330 or to add a recognition target device. The machine learning algorithm may include at least one of deep learning, a gaussian mixture model (GMM), a support vector machine (SVM), or a random forest. If the electronic device 101 is unable to identify the external electronic device which corresponds to the detected EM signal via the classifier, the electronic device 101 may request an analysis for the EM signal from an external EM server. According to various embodiments of the present invention, the electronic device 101 and the EM server may interwork with each other to analyze the EM signal. For example, the electronic device 101 may firstly analyze the EM signal and then the EM server may secondly analyze the EM signal. On the contrary to this, the EM server may firstly analyze the EM signal and then the electronic device 101 may secondly analyze the EM signal.

The EM signal sensing function may be always activated when the electronic device 101 is used, however, according to various embodiments, the EM signal sensing function may be set to be activated only if the corresponding function is required to prevent current consumption or malfunction. The EM signal sensing function may be activated if a designated application (e.g., Samsung Connect™, SmartThings™, Bixby™, or Pay™) which is run on the electronic device 101 requires the EM sensing function, or if one or more conditions (e.g., on/off switching of a display of the electronic device 101, a user's input, a designated location or time, or a connection to a specific device) designated by the user are satisfied.

The electronic device 101 may obtain information about the external electronic devices 310, 320, and 330 via the analysis of the sensed EM signal, and provide information related to an external electronic device based on this. According to various embodiments of the present invention, the information related to the external electronic device may be provided as shown in FIG. 3b or FIG. 3c.

For example, as shown in FIG. 3b, if the electronic device 101 is in contact with a refrigerator 340 or the electronic device 101 approaches the refrigerator 340 within a determined distance, the electronic device 101 may sense an EM signal generated from the refrigerator 340, recognize the refrigerator 340 via analysis of the sensed EM signal, and provide control-related information 341 for the refrigerator 340. According to various embodiments of the present invention, if the refrigerator 340 recognized by the EM signal sensing is a device which is not registered in a designated control application (e.g., Samsung Connect™ or SmartThings™) of the electronic device 101, a procedure of registering the refrigerator 340 in the designated control application may be performed, and then information (e.g., a Samsung Connect™ screen) for controlling the refrigerator 340 may be provided.

According to various embodiments of the present invention, if the refrigerator 340 recognized by the EM signal sensing is a device which is registered in the designated control application of the electronic device 101, the information for controlling the refrigerator 340 may be directly provided without performing a device searching procedure. The control-related information 341 for the refrigerator may include a screen (or a page) displaying a current control state for the refrigerator 340 or a screen (or a page) capable of controlling the refrigerator 340, and content of provided information thereof may vary according to a location at which the EM signal is sensed. For example, if the position at which the EM signal is sensed is on one side of a body of the refrigerator 340, the information for controlling the refrigerator 340 may be provided, however, if the position at which the EM signal is sensed is a specific part (e.g., a handle or inside of the refrigerator), purchase-related information related to the refrigerator 340 may be provided.

As shown in FIG. 3c, for example, if the electronic device 101 is in contact with an external electronic device (e.g., a laptop 350) or approaches the external electronic device (e.g., the laptop 350) within a determined distance while a designated payment application (e.g., Samsung Pay™) is being run, the electronic device 101 may sense an EM signal generated from the laptop 350 by activating an EM sensing function. If the electronic device 101 obtains an analysis result of the sensed EM signal to recognize the laptop 350, the electronic device 101 may provide purchase-related information 351 related to the laptop 350. The purchase-related information 351 may include a price comparison screen, and a purchase or payment screen for a laptop 350 model product recognized by the EM signal sensing, and if a purchase for the model product recognized by the EM signal sensing or provision of information about the model product recognized by the EM signal sensing is impossible, information about a similar product may be provided.

The purchase-related information 351 related to the laptop 350 may be provided by using various $3^{rd}$ Party functions in addition to the designated payment application of the electronic device 101, and, in this case, a geographical location of the electronic device 101 may be considered. For example, if a region at which the EM signal is sensed is United States of America, a product of a specific company which sells a corresponding product in United States of America may be searched, and a product may be searched via a service designated for each region.

The purchase-related information 351 related to the laptop 350 may be information about the laptop 350 itself recognized by the EM signal sensing, or information about an item related to the laptop 350. For example, if the electronic device 101 is in contact with a keyboard or a touch pad portion of the laptop 350 to sense an EM signal, purchase-related information about a peripheral device such as a keyboard, a mouse, or a memory may be provided, and the purchase-related information may be configured differently based on an existing use history or purchase history, or current status information.

The purchase-related information 351 related to the laptop 350 may vary according to the location of the electronic device 101, whether the electronic device 101 and the laptop 350 have been already connected, or whether an account is registered. For example, if the electronic device 101 senses an EM signal of a laptop in an electronics store, the electronic device 101 provides price information of the corresponding laptop 350, and if the electronic device 101 senses an EM signal of a laptop which has been already connected to the electronic device 101 at home, the electronic device 101 may provide purchase-related information for a peripheral device of the laptop 350.

After providing the purchase-related information, a purchase confirmation or payment procedure may be performed by using information which has been already stored in the electronic device 101. For example, delivery address information or main card information which has been already stored in the electronic device 101 may be used for the purchase confirmation or payment procedure. If a purchase or payment is performed after sensing an EM signal via the designated payment application of the electronic device 101, an additional benefit (e.g., rewards accumulation of Samsung Pay) may be provided.

Figure 4A:
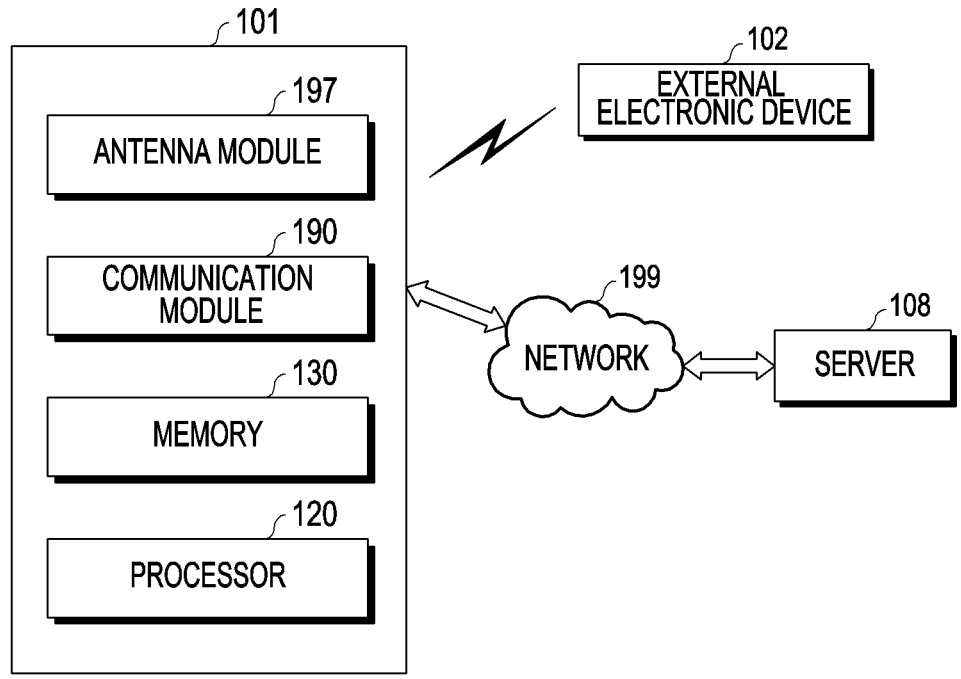
FIG. 4a is a block diagram illustrating an electronic device according to various embodiments of the present invention.

FIG. 4a is a block diagram illustrating an electronic device 101 according to various embodiments of the present invention. Referring to FIG. 4a, the electronic device 101 is a device (e.g., a smartphone or a tablet computer) which controls an external electronic device 102, and may include an antenna module 197, a communication module 190, a memory 130, or a processor 120. If the electronic device 101 is located in a short distance within a designated distance from an external electronic device 104 with which the electronic device 101 may communicate via a second network 199 in FIG. 1, the electronic device 101 may also operate for an external electronic device 102 corresponding to the external electronic device 102.

According to various embodiments of the present invention, the antenna module 197 may sense an EM signal generated from the external electronic device 102. The electronic device 101 may additionally include the antenna module 197 and an EM signal detecting circuit 400 illustrated in FIG. 4b to detect a unique frequency due to EM interference generated from the external electronic device 102.

Figure 4B:
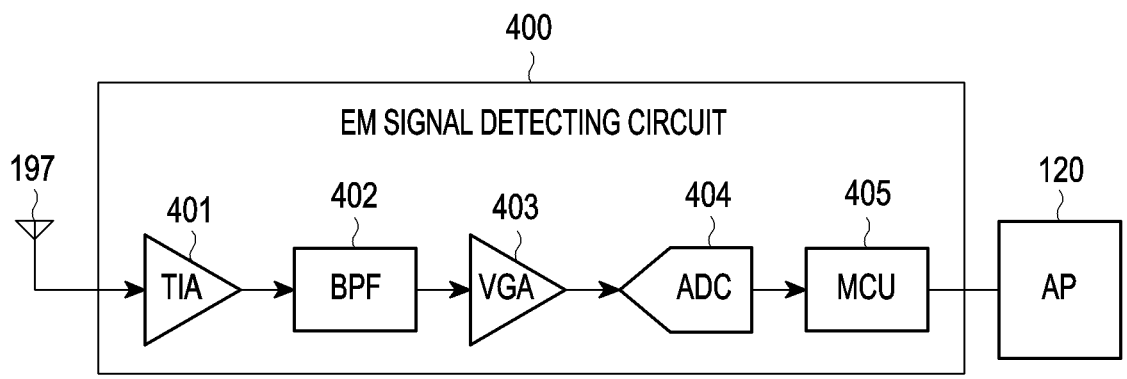
FIG. 4b is a diagram illustrating an EM signal sensing block according to various embodiments of the present invention.

FIG. 4b illustrates an EM signal detecting circuit 400 according to various embodiments of the present invention. The EM signal detecting circuit 400 may include a transimpedance amplifier (TIA) 401, a band pass filter (BPF) 402, a variable gain amplifier (VGA) 403, an-to-digital converter (ADC) 404, or a microcontroller (micro controller unit: MCU) 405. According to an embodiment, an antenna module 197 may have a reception bandwidth of 1 MHz or less in which an electromagnetic interference signal may be received along with poor interference cancellation. The transimpedance amplifier 401 may amplify a frequency of 1 MHz or less received from the antenna module 197. The band pass filter 402 may filter a signal which is amplified and received from the transimpedance amplifier 401 around a specific interest target frequency which defines a characteristic pattern. The variable gain amplifier 403 may output a signal at a constant level over a preset gain range to improve a noise characteristic of the filtered signal and an external interference signal control characteristic. The analog-to-digital converter 404 may convert an analog signal provided from the variable gain amplifier 403 into a digital signal and provide the microcontroller 405 with the digital signal. The microcontroller 405 may compare a frequency signal which is converted into an optimal state with a frequency table stored in the electronic device 101, identify the external electronic device 102, and provide a processor 120 of the electronic device 101 with identified information. According to various embodiments of the present invention, the microcontroller 405 may directly provide the processor 120 of the electronic device 101 with provided frequency information. In this case, the operation of identifying the external electronic device 102 by the frequency comparison may be performed by a request from an external server 108 or may be performed by the processor 120 of the electronic device 101 itself.

Referring back to FIG. 4a, a memory 130 may store instructions which, when executed, control the processor 120 to perform various operations. For example, if the electronic device 101 is in contact with the external electronic device 102 or approaches the external electronic device 102 within a determined distance, the processor 120 may control to obtain an EM signal from the external electronic device 102 by activating an EM signal sensing function of the antenna module 197. According to various embodiments, the EM signal sensing function may be activated if a designated application (e.g., Samsung Connect™, SmartThings™, Bixby™, or Pay™) is run on the electronic device 101, or one or more conditions (e.g., on/off switching of a display in the electronic device 101, a user's input, a designated location or time, or a connection to a specific device) which are designated by the user or the electronic device 101 are satisfied.

After being activated, the EM signal sensing function may be automatically deactivated again according to one or more designated conditions (e.g., switching on/off of the display, the user's an additional input, a departure from the designated location, elapse of the designated time, and a disconnection from the specific device). For example, if the electronic device 101 is in contact with the external electronic device 102 or approaches the external electronic device 102 within a determined distance, the EM signal may be obtained by using the activated EM signal sensing function, and then if the electronic device 101 moves from the location, the EM signal sensing function may be automatically deactivated.

The processor 120 may identify the external electronic device 102 which corresponds to the EM signal based on at least part of the EM signal which is sensed via the antenna module 197. The processor 120 may recognize the external electronic device 102 which corresponds to a frequency of the EM signal based on a frequency table stored in the memory 130. If it is impossible to identify the external electronic device 102 which corresponds to the EM signal, the processor 120 may request information which corresponds to the EM signal from an external server 108 via the communication module 190. The processor 120 may receive information about the external electronic device 102 from the server 108 in response to the request. The information about the external electronic device 102 may include at least one of a device type of the external electronic device 102, a model name of the external electronic device 102, account information of the external electronic device 102, and current state information of the external electronic device 102, or a location at which the EM signal is sensed, which are analyzed based on the EM signal.

The processor 120 may identify whether the external electronic device 102 is registered in a designated control application (e.g., Samsung Connect™, or SmartThings™) based on the received information about the external electronic device 102. The electronic device 101 may identify whether the external electronic device 102 is registered in the control application via a request to the external server 108 or may identify whether the external electronic device 102 is registered in the control application itself. The server from which the processor 120 requests the information which corresponds to the EM signal and the server from which the processor 120 requests whether the external electronic device 102 is registered in the designated control application may be different from each other, and may be one integrated server according to various embodiments.

The processor 120 may identify whether the external electronic device 102 is registered in a designated control application (e.g., Samsung Connect™, or SmartThings™) based on the received information about the external electronic device. The electronic device 101 may identify whether the external electronic device 102 is registered in the control application via a request to the external server 108 or may identify whether the external electronic device 102 is registered in the control application itself. The server from which the processor 120 requests the information which corresponds to the EM signal and the server from which the processor 120 requests whether the external electronic device 102 is registered in the designated control application may be different from each other, and may be one integrated server according to various embodiments.

The processor 120 may provide information related to the external electronic device 102 based on whether the external electronic device 102 is registered. For example, if it is identified that the external electronic device 102 is registered in the designated control application, the processor 120 may provide first information about control for the external electronic device 102. The first information may include a control screen capable of controlling the external electronic device 102 via the control application. If it is identified that the external electronic device 102 is not registered in the designated control application, the processor 120 may provide second information about registration of the external electronic device 102. The second information may include a registration screen which is generated for connecting the external electronic device 102 to the control application and registering the external electronic device 102 in the control application, and the processor 120 may provide the first information related to the control for the external electronic device 102 after a registration procedure is terminated.

According to various embodiments of the present invention, if it is identified that the external electronic device 102 is not registered in the designated control application, the processor 120 may additionally provide third information about a purchase related to the external electronic device 102 based on the information about the external electronic device 102. The third information may include a purchase or payment screen which is generated for purchasing a product related to the external electronic device 102 by using a designated payment application (e.g., Samsung Pay™) of the electronic device 101 or various 3$^{rd}$ Party functions. When additionally providing the third information, the processor 120 may sense the user's biometric information (e.g., a fingerprint, an iris, a face, a vein, a voice, or a signature) and use the user's biometric information for payment authentication.

An electronic device 101 according to one of various embodiments of the present invention may include an antenna module 197 configured to sense an electromagnetic (EM) signal generated from an external electronic device 102; a communication module 190; a processor 120 operatively connected to the antenna module 197 and the communication module 190; and a memory 130 storing instructions which, are configured to, when executed, cause the processor 120 to identify the external electronic device 102 based on at least part of the EM signal sensed from the external electronic device 102 via the antenna module 197, identify whether the identified external electronic device 102 is registered in a designated control application, and provide information related to the external electronic device 102 based on whether the external electronic device 102 is registered.

According to various embodiments of the present invention, the instructions may be configured to cause the processor 120 to obtain the EM signal from the external electronic device 102 by activating an EM signal sensing function of the antenna module 197 if at least one designated condition is satisfied.

According to various embodiments of the present invention, the instructions may be configured to cause the processor 120 to request information which corresponds to the EM signal from a server 108 via the communication module 190, and identify the external electronic device 102 based on information about the external electronic device 102 received from the server 108 in response to the request.

According to various embodiments of the present invention, the instructions may be configured to cause the processor 120 to provide first information about control for the external electronic device 102 if it is identified that the external electronic device 102 is registered in the designated control application.

According to various embodiments of the present invention, the first information may be configured to include a control screen capable of controlling the external electronic device 102 via the designated control application.

According to various embodiments of the present invention, the instructions may be configured to cause the processor 120 to provide second information about registration of the external electronic device 102 if it is identified that the external electronic device 102 is not registered in the designated control application.

According to various embodiments of the present invention, the second information may be configured to include a registration screen which is generated for connecting the external electronic device 102 to the designated control application and registering the external electronic device 102 in the designated control application.

According to various embodiments of the present invention, the information about the external electronic device 102 may include at least one of a device type of the external electronic device 102, a model name of the external electronic device 102, account information of the external electronic device 102, and current state information of the external electronic device 102, or a location at which the EM signal is sensed, which are analyzed based on the EM signal.

According to various embodiments of the present invention, the instructions may be configured to cause the processor 120 to additionally provide third information about a purchase related to the external electronic device 102 based on information about the external electronic device 102 if it is identified that the external electronic device 102 is not registered in the designated control application.

Figure 5:
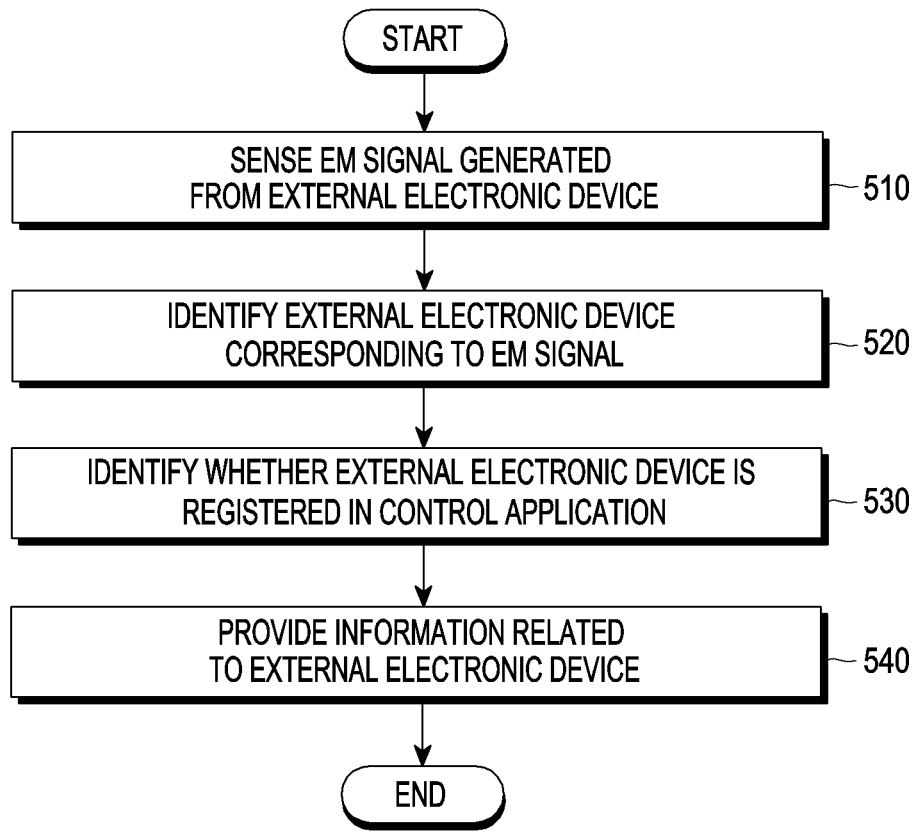
FIG. 5 is a flowchart illustrating a service providing method for an external electronic device in an electronic device according to various embodiments of the present invention.

FIG. 5 is a flowchart illustrating a service providing method for an external electronic device 102 in an electronic device 101 according to various embodiments of the present invention.

According to an embodiment, if the electronic device 101 is in contact with the external electronic device 102 or if the electronic device 101 approaches the external electronic device 102 within a determined distance, the electronic device 101 may control the external electronic device 102 by using an EM signal which corresponds to the external electronic device 102 which is obtained via an EM signal sensing function.

Referring to FIG. 5, in operation 510, the electronic device 101 may sense an EM signal generated from the external electronic device 102 (e.g., 310, 320, and 330 in FIG. 3a, 340 in FIG. 3b, and 350 in FIG. 3c). For example, the electronic device 101 may obtain the EM signal from the external electronic device 102 by activating an EM signal sensing function of an antenna module 197. The EM signal sensing function may be activated if a designated application (e.g., Samsung Connect™, SmartThings™, or Bixby™) is run on the electronic device 101, or if one or more conditions (e.g., on/off switching of a display of the electronic device 101, a user's input, a designated location or time, or a connection to a specific device) designated by the user are satisfied.

In operation 520, the electronic device 101 may identify the external electronic device 102 which corresponds to the sensed EM signal. According to an embodiment, the electronic device 101 may identify the external electronic device 102 which corresponds to the EM signal by using a classifier included in the electronic device 101, and receive, from an external server 108, a frequency table including information about unique frequencies which correspond to external electronic devices related to the electronic device 101 in advance to store the frequency table in a memory 130 for identifying the external electronic device 102. The electronic device 101 may identify the external electronic device 102 which corresponds to the EM signal by referring to the frequency table and generate information about the identified external electronic device 102. The classifier may be continuously learned by using a machine learning algorithm including at least one of deep learning, a gaussian mixture model (GMM), a support vector machine (SVM), or a random forest and then be updated.

According to various embodiments of the present invention, if the electronic device 101 is unable to identify the external electronic device 102 from the frequency table stored in the memory 130, the electronic device 101 may request information which corresponds to the sensed EM signal from the external server 108 via a communication module 190. The server 108 may be a server capable of analyzing the EM signal because the server 108 stores frequency information about a greater number of external electronic devices than the frequency table stored in the memory 130 of the electronic device 101. The server 108 may identify the external electronic device 102 which corresponds to the EM signal by analyzing the EM signal received from the electronic device 101 based on the frequency information, and generate information about the external electronic device 102. The electronic device 101 may receive the information about the external electronic device 102 from the server 108 via the communication module 190 in response to the request. The information about the external electronic device 102 may include at least one of a device type of the external electronic device 102, a model name of the external electronic device 102, account information of the external electronic device 102, and current state information of the external electronic device 102, or a location at which the EM signal is sensed, which are analyzed based on the EM signal.

In operation 530, the electronic device 101 may identify whether the external electronic device 102 is registered in a designated control application based on the received information about the external electronic device 102. For example, the electronic device 101 may recognize that the external electronic device 102 having a previous communication connection history with the electronic device 101 is registered in the designated control application. Whether the external electronic device 102 is registered in the control application may be identified via a request to a separate server. The separate server may be different from the server 108 from which the information which corresponds to the EM signal is requested in operation 520, or may be a single integrated server. According to various embodiments of the present invention, if information about whether the external electronic device 102 is registered is stored in the memory 130 of the electronic device 101, the external electronic device 102 may identify whether the external electronic device 102 is registered in the control application itself.

In operation 540, the electronic device 101 may provide information related to the external electronic device 102 based on whether the identified external electronic device 102 is registered. If it is identified that the external electronic device 102 is registered in the control application, the electronic device 101 may provide the information related to the external electronic device 102 along with first information about control for the external electronic device 102. For example, the first information may include a control screen capable of controlling the external electronic device 102 via the control application. If it is identified that the external electronic device 102 is not registered in the control application, the electronic device 101 may provide information related to the external electronic device 102 along with second information about registration of the external electronic device 102. For example, the second information may include a registration screen which is generated for connecting the external electronic device 102 to the control application and registering the external electronic device 102 in the control application. In this case, the electronic device 101 may provide the first information about the control for the external electronic device 102 after a registration procedure is terminated.

In operation 540, the electronic device 101 may additionally provide third information about a purchase related to the external electronic device 102 based on the information about the external electronic device 102 received in operation 530. For example, if biometric information which corresponds to biometric information (e.g., a fingerprint, an iris, a face, a vein, a voice, or a signature) registered in the control application is inputted to the electronic device 101, the third information may be additionally provided, and the third information may include a purchase or payment screen which is generated for purchasing a product related to the external electronic device 102 by using a designated payment application (e.g., Samsung Pay™) of the electronic device 101. The third information may be provided sequentially after the first information or the second information is provided, or may be provided simultaneously with the first information or the second information.

A method for controlling an external electronic device 102 in an electronic device 101 according to one of various embodiments of the present invention may include an operation 510 of sensing an electromagnetic (EM) signal generated from the external electronic device 102, an operation 520 of identifying the external electronic device 102 based on at least part of the EM signal sensed from the external electronic device 102, an operation 530 of identifying whether the identified external electronic device 102 is registered in a designated control application, and an operation 540 of providing information related to the external electronic device 102 based on whether the external electronic device 102 is registered.

According to various embodiments of the present invention, the method for controlling the external electronic device 102 in the electronic device 101 may further include an operation of controlling to obtain the EM signal from the external electronic device 102 by activating an EM signal sensing function of an antenna module if at least one designated condition of the electronic device 101 is satisfied.

According to various embodiments of the present invention, the operation 520 of identifying the external electronic device 102 may include an operation of requesting information which corresponds to the EM signal from a server 108 via the communication module; and an operation of identifying the external electronic device 102 based on information about the external electronic device 102 received from the server 108 in response to the request.

According to various embodiments of the present invention, the operation 540 of providing the information related to the external electronic device 102 may include an operation of providing first information about control of the external electronic device 102 if it is identified that the external electronic device 102 is registered in the designated control application, and the first information may include a control screen capable of controlling the external electronic device 102 via the designated control application.

According to various embodiments of the present invention, the operation 540 of providing the information related to the external electronic device 102 may include an operation of providing second information about registration of the external electronic device 102 if it is identified that the external electronic device 102 is not registered in the designated control application, and the second information may include a registration screen which is generated for connecting the external electronic device 102 to the designated control application and registering the external electronic device 102 in the designated control application.

According to various embodiments of the present invention, the information about the external electronic device 102 may include at least one of a device type of the external electronic device 102, a model name of the external electronic device 102, account information of the external electronic device 102, and current state information of the external electronic device 102, or a location at which the EM signal is sensed, which are analyzed based on the EM signal.

According to various embodiments of the present invention, if it is identified that the external electronic device 102 is not registered in the designated control application, an operation of additionally providing third information about a purchase related to the external electronic device 102 based on information about the external electronic device 102 may be further included.

Figure 6:
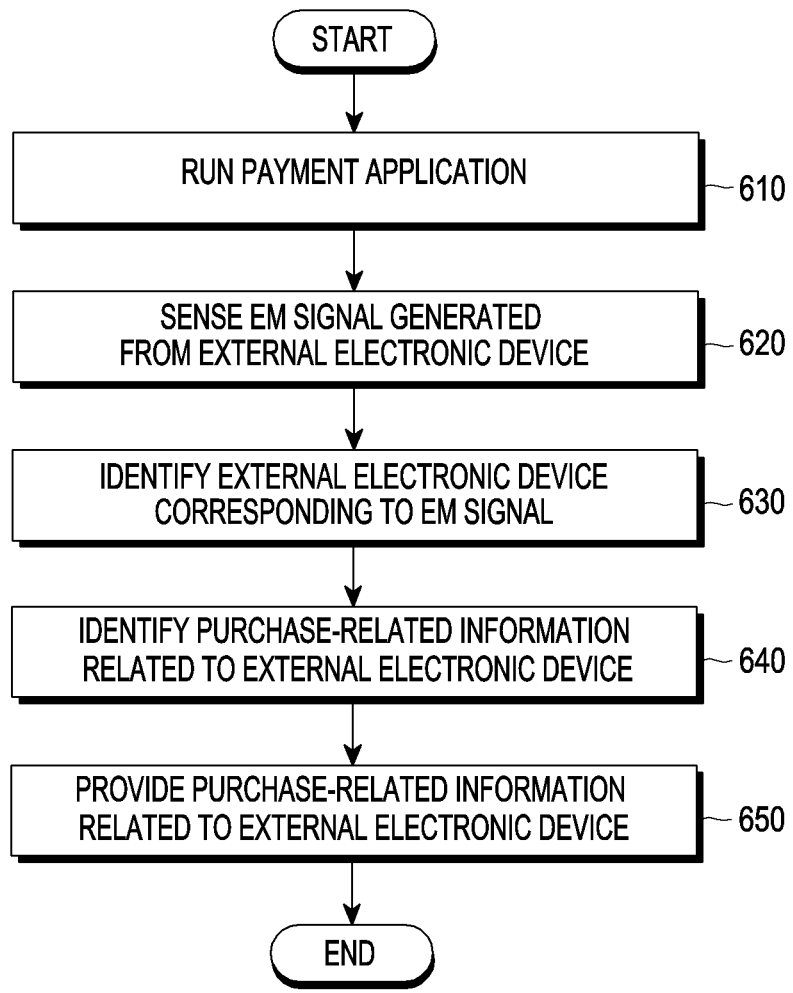
FIG. 6 is a flowchart illustrating a service providing method for an external electronic device in an electronic device according to various embodiments of the present invention.

FIG. 6 is a flowchart illustrating a service providing method for an external electronic device 102 in an electronic device 101 according to various embodiments of the present invention.

According to an embodiment, if the electronic device 101 is in contact with the external electronic device 102 or if the electronic device 101 approaches the external electronic device 102 within a determined distance while a designated payment application (e.g., Samsung Pay™) is running, the electronic device 101 may provide a purchase service related to the external electronic device 102 by using an EM signal which is obtained via an EM signal sensing function.

Referring to FIG. 6, in operation 610, the electronic device 101 may run a designated payment application. For example, the payment application may provide price comparison information, purchase progress information, or a payment means for a recognized purchase target product, and support a magnetic secure transmission (MST) payment means or a near field communication (NFC) payment means for payment progress upon purchasing a product. According to various embodiments of the present invention, the payment application may include an EM-dedicated card which may be used when a purchase proceeds using an EM signal. According to various embodiments of the present invention, if there is biometric information (e.g., a fingerprint, an iris, a face, a vein, a voice, or a signature) registered in the payment application, a payment function may be provided by using a payment means included in the payment application after a user is authenticated via matching the biometric information registered in the payment application with biometric information inputted from the user. If there is no biometric information registered in the payment application, shopping information or a product purchase route related to the purchase target product may be provided.

In operation 620, the electronic device 101 may sense an EM signal occurred from the external electronic device 102. For example, the electronic device 101 may obtain the EM signal from the external electronic device 102 by activating an EM signal sensing function of an antenna module 197. The EM signal sensing function may be activated by the payment application which is run in operation 610. According to various embodiments of the present invention, if the user selects the EM-dedicated card, the EM signal sensing function may be activated. The EM-dedicated card may mean a card which activates the EM signal sensing function and a payment function using an EM signal of the electronic device 101. The EM signal sensing function may be activated during designated time or until payment is completed using the EM-dedicated card. If payment proceeds by using the biometric information registered in the payment application, the EM signal sensing function may be deactivated before the payment is completed. For example, if the payment proceeds by using an MST payment scheme of the payment application, the EM signal sensing function may be activated until a magnetic signal for payment progress is generated in an MST card, or the EM signal sensing function may be deactivated at the same time as the magnetic signal is generated.

In operation 630, the electronic device 101 may identify the external electronic device 102 which corresponds to the sensed EM signal. According to an embodiment, the electronic device 101 may identify the external electronic device 102 which corresponds to the EM signal by using a classifier included in the electronic device 101, and receive, from an external server 108, a frequency table including information about unique frequencies which correspond to external electronic devices related to the electronic device 101 in advance to store the frequency table in a memory 130 for identifying the external electronic device 102. The electronic device 101 may identify the external electronic device 102 which corresponds to the EM signal via frequency comparison based on the frequency table and generate information about the identified external electronic device 102. According to various embodiments of the present invention, if the electronic device 101 is unable to identify the external electronic device 102 from the frequency table stored in the memory 130, the electronic device 101 may request information which corresponds to the sensed EM signal from the external server 108 via a communication module 180 190. The server 108 may be a server capable of analyzing the EM signal because the server 108 stores frequency information about a greater number of external electronic devices than the frequency table stored in the memory 130 of the electronic device 101. The server 108 may identify the external electronic device 102 which corresponds to the EM signal by analyzing the EM signal received from the electronic device 101 based on the frequency information, and generate information about the external electronic device 102. According to an embodiment, the electronic device 101 may receive the information about the external electronic device 102 from the server 108 via the communication module 190. The information about the external electronic device 102 may include at least one of a device type of the external electronic device 102, a model name of the external electronic device 102, account information of the external electronic device 102, and current state information of the external electronic device 102, or a location at which the EM signal is sensed, which are analyzed based on the EM signal.

In operation 640, the electronic device 101 may identify purchase-related information related to the external electronic device 102 based on the received information about the external electronic device 102. The purchase-related information related to the external electronic device 102 may be identified via a request to a separate server. The server may be different from the server 108 from which the information which corresponds to the EM signal is requested in operation 630, or may be a single integrated server.

The purchase-related information related to the external electronic device 102 may be information about the external electronic device 102 itself, or information about a product related to the external electronic device 102. For example, if the electronic device 101 senses an EM signal of a washing machine, the electronic device 101 may provide purchase-related information for a model product of the corresponding washing machine, or may provide purchase-related information for a product related to the washing machine such as laundry detergent. The purchase-related information may include purchase history information about a previously purchased product or purchase availability information guiding a product purchase route, and may vary according to a location of the electronic device 101, whether the electronic device 101 has been already connected to the washing machine, or whether an account is registered. For example, if the electronic device 101 senses an EM signal of a washing machine in an electronics store, the electronic device 101 may provide purchase availability information including at least one of price information of a corresponding washing machine model, information for contact with an employee in charge, or information for purchase process, and if the electronic device 101 senses an EM signal of a washing machine which has been previously connected at home, the electronic device 101 may provide purchase history information about previously purchased laundry detergent or purchase availability information for proceeding with a procedure for purchasing laundry detergent.

According to various embodiments of the present invention, the purchase-related information may be configured differently according to a location at which the EM signal is sensed. For example, if the location at which the EM signal is sensed is on one side of a body of a washing machine, information about the washing machine itself may be provided, however, if the location at which the EM signal is sensed is a specific part (e.g., the vicinity of a detergent inlet of the washing machine), purchase-related information for laundry detergent may be provided. The purchase-related information may be configured in consideration of a history previously used in an external electronic device or a purchase history. For example, the electronic device 101 may provide purchase-related information about laundry detergent which has been previously used in a washing machine identified by EM signal sensing.

In operation 650, the electronic device 101 may provide purchase-related information related to the external electronic device 102. The purchase-related information may include a purchase screen which is generated for purchasing at least one of the external electronic device 102 or a product related to the external electronic device 102 via the payment application. The user may proceed with a purchase confirmation or payment procedure by using the purchase-related information provided from the electronic device 101.

A method for providing a service related to an external electronic device 102 in an electronic device 101 according to one of various embodiments of the present invention may include an operation 610 of running a designated payment application; an operation 620 of sensing an electromagnetic (EM) signal generated from the external electronic device 102; an operation 630 of identifying the external electronic device 102 based on at least part of the EM signal sensed from the external electronic device 102; an operation 640 of identifying purchase-related information related to the identified external electronic device 102; and an operation 650 of generating and providing the purchase-related information related to the external electronic device 102.

According to various embodiments of the present invention, the method for providing the service related to the external electronic device 102 in the electronic device 101 may further include an operation of controlling to obtain the EM signal from the external electronic device 102 by activating thea EM signal sensing function based on running of the designated payment application.

According to various embodiments of the present invention, the EM signal sensing function may be activated during designated time or until payment is completed.

According to various embodiments of the present invention, the purchase-related information may include a purchase screen which is generated for purchasing at least one of the external electronic device 102 or a product related to the external electronic device 102 via the designated payment application.

Figure 7:
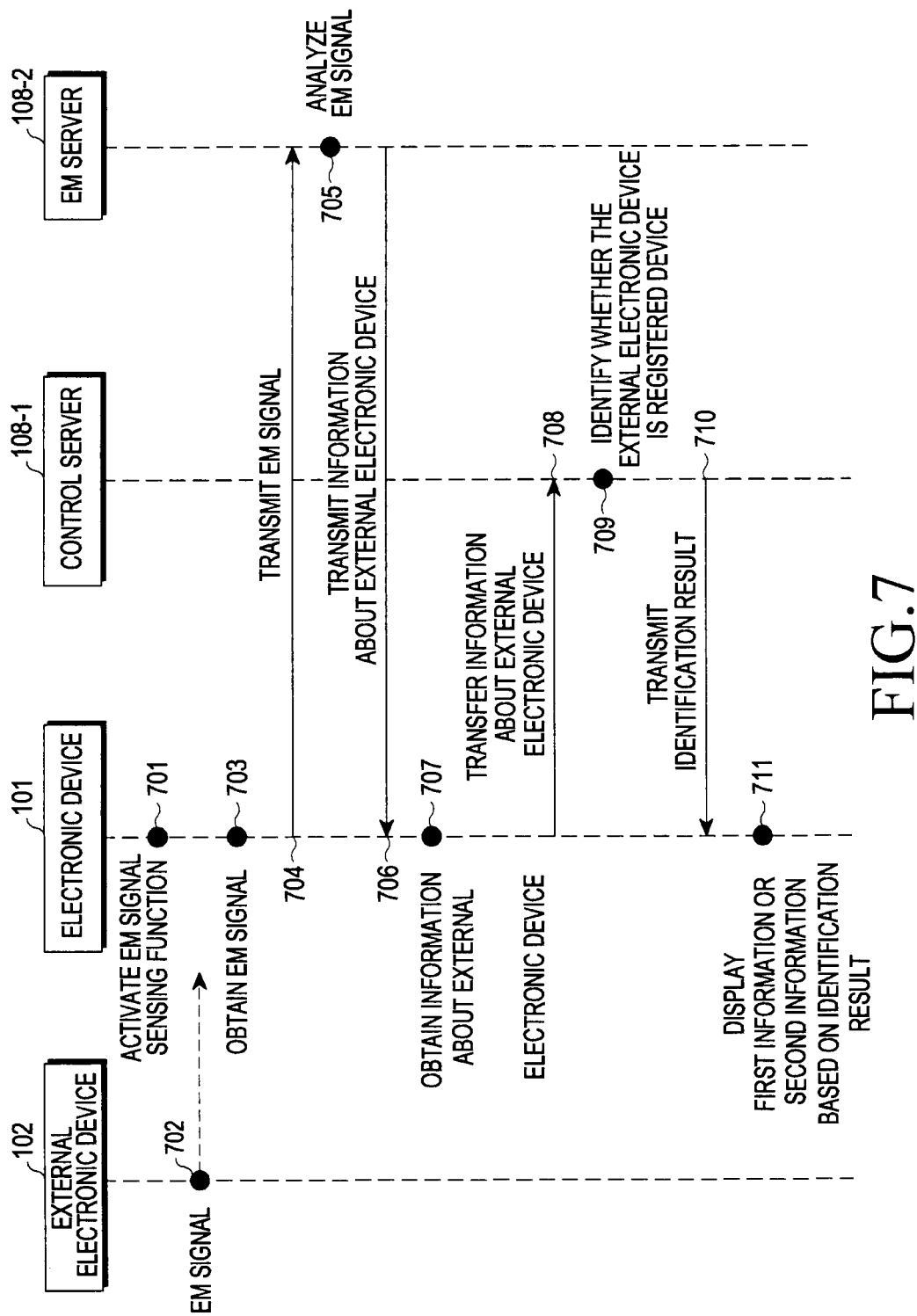
FIG. 7 is a flowchart illustrating a service providing procedure for an external electronic device in an electronic device according to various embodiments of the present invention.

FIG. 7 is a flowchart illustrating a service providing procedure for an external electronic device in an electronic device according to various embodiments of the present invention. In FIG. 7, an electronic device 101 may communicate with an external electronic device 102, a control server 108-1, or an EM server 108-2 via a second network 199 in FIG. 1. If the electronic device 101 is located in a short distance within a designated distance from an external electronic device 104 with which the electronic device 101 may communicate via the second network 199, the electronic device 101 may operate for the external electronic device 104 corresponding to the electronic device 102.

Referring to FIG. 7, in operation 701, the electronic device 101 may activate an EM signal sensing function. The EM signal sensing function may be always activated when the electronic device 101 is used, however, according to various embodiments, the EM signal sensing function may be set to be activated only if a corresponding function is required to prevent current consumption or malfunction. For example, the EM signal sensing function may be activated if a designated control application (e.g., Samsung Connect™, SmartThings™, or Bixby™, or Pay™) is run on the electronic device 101, or if one or more conditions (e.g., on/off switching of a display of the electronic device 101, a user's input, a designated location or time, or a connection to a specific device) designated by the user are satisfied. After being activated, the EM signal sensing function may be automatically deactivated again according to at least one condition (e.g., on/off switching of the display, the user's additional input, departure from the designated location, elapse of the designated time, disconnection from the specific device).

In operation 702, the external electronic device 102 may generate an EM signal. For example, the EM signal may be a frequency signal due to EM interference generated from electronic components in the external electronic device 102, and include a type of the external electronic device 102, a sensing location in the external electronic device 102, or a unique frequency which varies according to a current state of the external electronic device 102.

In operation 703, the electronic device 101 may approach the external electronic device 102 to obtain the EM signal. For example, the EM signal may be obtained by using the EM signal sensing function activated in operation 701.

In operation 704, the electronic device 101 may transmit the EM signal obtained from the external electronic device 102 to the EM server 108-2. For example, the EM server 108-2 may be a server capable of analyzing the EM signal by using a classifier which has a function of identifying a model name for the external electronic device 102. The classifier may identify the external electronic device 102 which corresponds to the obtained EM signal by referring to a frequency table which has been previously stored in the EM server 108-2, and the frequency table may include unique frequencies which correspond to various external electronic devices and model names or device types of the external electronic devices which correspond to the unique frequencies.

In operation 705, the EM server 108-2 may analyze the EM signal received from the electronic device 101 based on the frequency table. The EM server 108-2 may identify information about the external electronic device 102 via the analysis of the EM signal. The information about the external electronic device 102 may include at least one of a type, a model name, account information, and current state information of the external electronic device 102, or a location at which the EM signal is sensed in the external electronic device 102.

In operation 706, the EM server 108-2 may transmit the information about the external electronic device 102 which is identified based on the analysis to the electronic device 101. According to various embodiments of the present invention, if the electronic device 101 stores the classifier which has the function of identifying the model name for the external electronic device 102, the electronic device 101 may obtain the information about the external electronic device 102 by using the classifier without requesting the analysis for the EM signal from the EM server 108-2. In this case, operations 704 and 706 may be omitted, and operation 705 may be performed in the electronic device 101.

In operation 707, the electronic device 101 may obtain the information about the external electronic device 102.

In operation 708, the electronic device 101 may transfer the obtained information about the external electronic device 102 to the control server 108-1. The control server 108-1 may be a server of the control application (e.g., Samsung Connect™, SmartThings™, or Bixby™) installed in the electronic device 101. If there is a specific application being run on the electronic device 101, the information about the external electronic device 102 may be transferred to a server related to the corresponding application, and if there is no specific application being run, the information about the external electronic device 102 may be transferred to a server of a designated control application.

In operation 709, the control server 108-1 may identify whether the external electronic device 102 is a device registered in the designated control application based on the information about the external electronic device 102. In operation 710, the control server 108-1 may transmit the identification result to the electronic device 101. According to various embodiments of the present invention, the electronic device 101 may receive a list of external electronic devices which are registered in the control application in advance from the control server 108-1 and store the list of external electronic devices. In this case, the electronic device 101 may directly identify whether the external electronic device 102 is the device registered in the control application, operations 708 and 710 may be omitted, and operation 709 may be performed in the electronic device 101.

According to various embodiments of the present invention, in operation 706, the EM server 108-2 may not directly transmit the information about the external electronic device 102 to the electronic device 101, but may transmit the information about the external electronic device 102 to the control server 108-1. In this case, the control server 108-1 may identify whether the external electronic device 102 is registered based on the information about the external electronic device 102 obtained from the EM server 108-2 and information about the electronic device 101, and operations 707 and 708 may be omitted.

In FIG. 7, the EM server 108-2 and the control server 108-1 are shown to be different from each other, but may operate as one integrated server according to various embodiments of the present invention.

In operation 711, the electronic device 101 may display the information related to the external electronic device 102 based on the identification result. For example, if it is identified that the external electronic device 102 is registered in the control application, the electronic device 101 may display first information about control for the external electronic device. The first information may include a control screen capable of controlling the external electronic device 102 via the control application. For another example, if it is identified that the external electronic device 102 is not registered in the control application, the electronic device 101 may display second information about registration of the external electronic device 102. The second information may include a registration screen which is generated for connecting the external electronic device 102 to the control application and registering the external electronic device 102 in the control application. In this case, the electronic device 101 may provide the first information about the control for the external electronic device 102 after a registration procedure is terminated.

Figure 8:
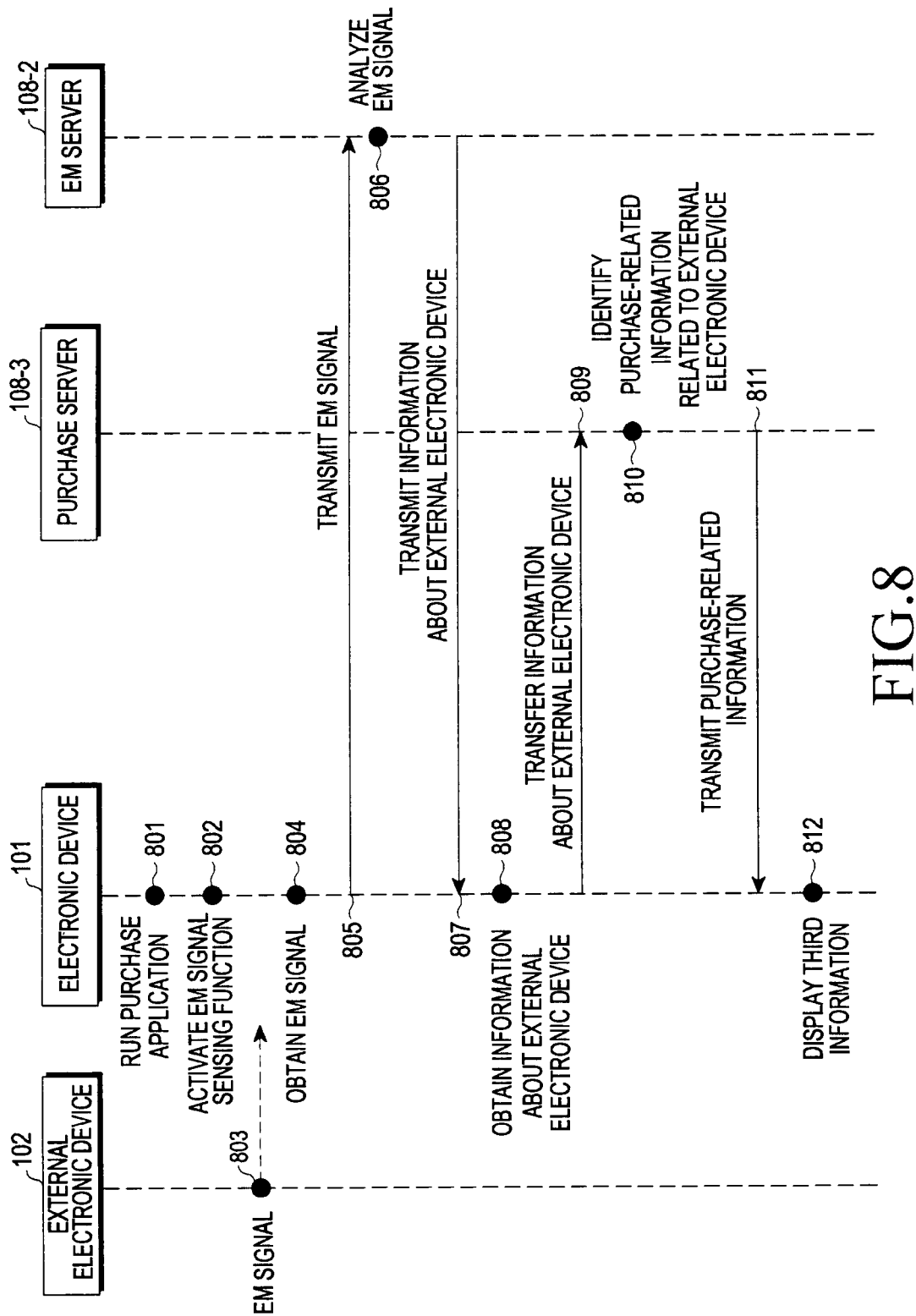
FIG. 8 is a flowchart illustrating a service providing procedure for an external electronic device in an electronic device according to various embodiments of the present invention.

FIG. 8 is a flowchart illustrating a service providing procedure for an external electronic device in an electronic device according to various embodiments of the present invention. In FIG. 8, an electronic device 101 may communicate with an external electronic device 102, a purchase server 108-3, or an EM server 108-2 via a second network 199 in FIG. 1. If the electronic device 101 is located in a short distance within a designated distance from an external electronic device 104 with which the electronic device 101 may communicate via the second network 199, the electronic device 101 may operate for the external electronic device 104 corresponding to the electronic device 102.

Referring to FIG. 8, in operation 801, the electronic device 101 may run a designated payment application (e.g., Samsung Pay™). The dedicated payment application may provide price comparison information, purchase progress information, or a payment means for a purchase target product. According to various embodiments of the present invention, if there is biometric information (e.g., a fingerprint, an iris, a face, a vein, a voice, or a signature) registered in the payment application, a payment function may be provided by using a payment means included in the payment application after a user is authenticated via matching the biometric information registered in the payment application with biometric information inputted from the user. If there is no biometric information registered in the payment application, shopping information or a product purchase route related to the purchase target product may be provided.

In operation 802, the electronic device 101 may activate an EM signal sensing function. The EM signal sensing function may be activated by the run payment application. For example, if the payment application includes an EM-dedicated card which may be used when a purchase proceeds using an EM signal, the EM signal sensing function may be activated if the user selects the EM-dedicated card. According to various embodiments of the present invention, the EM signal sensing function may be activated during designated time or until payment is completed using the EM-dedicated card. The EM-dedicated card is a card which may be used when a purchase proceeds using the EM signal, and may activate the EM signal sensing function of the electronic device 101 and the payment function using the EM signal. According to various embodiments of the present invention, a payment may proceed by using biometric information registered in the payment application. For example, if the payment proceeds by using an MST payment scheme of the payment application, the EM signal sensing function may be activated until a magnetic signal for payment progress is generated in an MST card, or the EM signal sensing function may be deactivated at the same time as the magnetic signal is generated.

In operation 803, the external electronic device 102 may generate an EM signal. The EM signal may be a frequency signal due to EM interference generated from electronic components in the external electronic device 102, and may include a unique frequency according to a type of the external electronic device 102, a sensing location, or a current state.

In operation 804, the electronic device 101 may approach the external electronic device 102 to obtain the EM signal. The EM signal may be obtained by using the EM sensing function activated in operation 802.

In operation 805, the electronic device 101 may transmit at least part of the EM signal obtained from the external electronic device 102 to the EM server 108-2. For example, the EM server 108-2 may be a server capable of analyzing the EM signal by using a classifier which has a function of identifying a model name for the external electronic device 102. The classifier may identify the external electronic device 102 which corresponds to the obtained EM signal by referring to a frequency table which has been previously stored in the EM server 108-2, and the frequency table may include unique frequencies which correspond to various external electronic devices and model names or device types of the external electronic devices which correspond to the unique frequencies.

In operation 806, the EM server 108-2 may analyze the EM signal received from the electronic device 101 based on the frequency table. The EM server 108-2 may identify information about the external electronic device 102 via the analysis of the EM signal. The information about the external electronic device 102 may include at least one of a type, a model name, account information, and current state information of the external electronic device 102, or a location at which the EM signal is sensed in the external electronic device 102.

In operation 807, the EM server 108-2 may transmit the information about the external electronic device 102 which is identified based on the analysis to the electronic device 101. According to various embodiments of the present invention, if the electronic device 101 stores the classifier which has the function of identifying the model name for the external electronic device 102, the electronic device 101 may obtain the information about the external electronic device 102 by using the classifier without requesting the analysis for the EM signal from the EM server 108-2. In this case, operations 805 and 807 may be omitted, and operation 806 may be performed in the electronic device 101.

In operation 808, the electronic device 101 may obtain the information about the external electronic device 102. In operation 809, the electronic device 101 may transfer the obtained information about the external electronic device 102 to the purchase server 108-3. The purchase server 108-3 may be a server of the payment application (e.g., Samsung Pay™) installed at the electronic device 101. In FIG. 8, the EM server 108-2 and the purchase server 108-3 are shown to be different from each other, but may operate as one integrated server according to various embodiments of the present invention. For example, in operation 807, the EM server 108-2 may not directly transmit the information about the external electronic device 102 to the electronic device 101, but may transmit the information about the external electronic device 102 to the purchase server 108-3. In this case, the purchase server 108-3 may identify purchase-related information related to the external electronic device 102 based on the information about the external electronic device 102 obtained from the EM server 108-2 and information about the electronic device 101, and operations 808 and 809 may be omitted.

In operation 810, the purchase server 108-3 may identify the purchase-related information related to the external electronic device 102 based on the information about the external electronic device 102. In operation 811, the purchase server 108-3 may transmit the identified purchase-related information related to the external electronic device 102 to the electronic device 101.

In operation 812, the electronic device 101 may display third information about a purchase related to the external electronic device 102 via graphics or sound. According to various embodiments of the present invention, the third information may be purchase-related information about the external electronic device 102 itself or purchase-related information about a product related to the external electronic device 102. The purchase-related information may include a purchase screen which is generated for purchasing at least one of the external electronic device 102 or a product related to the external electronic device 102 via the payment application. The third information may be configured by considering various items such as a location of the electronic device 101, whether the electronic device 101 has been already connected to the external electronic device 102, whether an account is registered, a location at which the EM signal is sensed in the external electronic device 102, or a type of the purchase server 108-3. For example, in a case that a product may be purchased in the purchase server 108-3, the purchase server 108-3 may perform operation 810 and operation 811 based on the information about the external electronic device 102 received from the electronic device 101, and the electronic device 101 may display a purchase screen for purchase product selection or a payment screen for product purchase approval as the third information based on the purchase-related information received from the purchase server 108-3. In a case that a product may not be purchased and only payment is supported in the purchase server 108-3, the electronic device 101 may generate information which induces a product purchase in the electronic device 101 based on the information about the external electronic device 102 obtained in operation 808 to display the information which induces the product purchase in the electronic device 101. In this case, in operation 809, the electronic device 101 may transmit payment approval request information according to the user's purchase decision to the purchase server 108-3, the purchase server 108-3 may identify whether payment is approved to transfer the payment approval result to the electronic device 101 in operations 810 and 811, and the electronic device 101 may display payment approval details as the third information.

Figure 9:
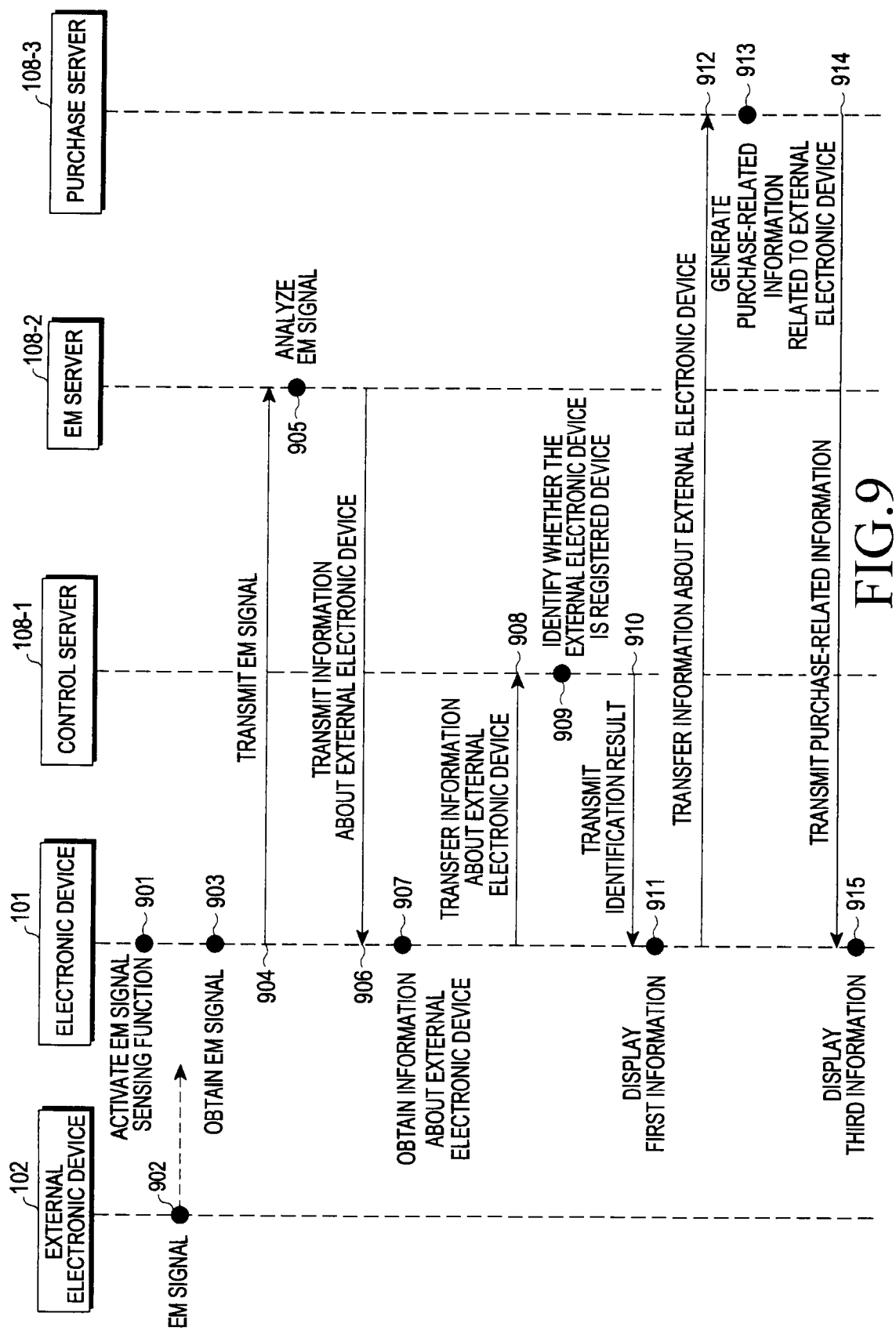
FIG. 9 is a flowchart illustrating a service providing procedure for an external electronic device in an electronic device according to various embodiments of the present invention.

FIG. 9 is a flowchart illustrating a service providing procedure for an external electronic device in an electronic device according to various embodiments of the present invention. In FIG. 9, an electronic device 101 may communicate with an external electronic device 102, a control server 108-1, an EM server 108-2, or a purchase server 108-3 via a second network 199 in FIG. 1. If the electronic device 101 is located within a designated distance from an external electronic device 104 with which the electronic device 101 may communicate via the second network 199, the electronic device 101 may operate for the external electronic device 104 to correspond to the external electronic device 102.

Operations 901 to 907 illustrated in FIG. 9 may be performed corresponding to all or some of operations 701 to 707 in FIG. 7. In operation 907, the electronic device 101 may additionally perform identification as to whether to transfer information about the external electronic device 102 identified via EM signal analysis to the control server 108-1 or the purchase server 108-3. According to various embodiments of the present invention, the electronic device 101 may additionally perform identification as to where to transfer the information about the external electronic device 102 by considering a function executed on the electronic device 101, a location, or items of a connected device. For example, if a designated payment application (e.g., Samsung Pay™) is being run on the electronic device 101, the electronic device 101 may transmit the information about the external electronic device 102 to the purchase server 108-3. For another example, if the electronic device 101 is connected to an AP used at home, the electronic device 101 may transmit the information about the external electronic device 102 to the control server 108-1. For still another example, if it is identified that a current location of the electronic device 101 is a shopping mall based on a GPS signal of the electronic device 101, the electronic device 101 may transmit the information about the external electronic device 102 to the purchase server 108-3.

According to various embodiments of the present invention, the electronic device 101 may identify where to transfer the information about the external electronic device 102 based on whether the external electronic device 102 is a device registered in the designated payment application. For example, in operation 907, the electronic device 101 may obtain the information about the external electronic device 102 to identify whether the external electronic device 102 is a device registered in a designated control application, and additionally perform identification as to whether to transmit the information about the external electronic device 102 to the control server 108-1 or the purchase server 108-3 based on the identification result. As the identification result of the electronic device 101, if the external electronic device 102 is the device registered in the control application, the electronic device 101 may display first information by performing operation 911 without transmitting the information about the external electronic device 102 anywhere. As the identification result of the electronic device 101, if the external electronic device 102 is a device which is not registered in the control application, the electronic device 101 may transmit the information about the external electronic device 102 to the purchase server 108-3, and in this case, operations 908 to 911 may be omitted.

For another example, when the electronic device 101 may not directly identify whether the external electronic device 102 is registered, the electronic device 101 may transfer the information about the external electronic device 102 to the control server 108-1 in operation 908. In operation 909, the control server 108-1 may identify whether the external electronic device 102 is the device registered in the designated control application based on the information about the external electronic device 102. If it is identified that the external electronic device 102 is the device registered in the designated control application based on the result of identifying whether the external electronic device 102 is registered transmitted from the control server 108-1 in operation 910, the electronic device 101 may display first information about control for the external electronic device 102 in operation 911. The first information may include a control screen of the external electronic device 102 registered in the control application.

If the result of identifying whether the external electronic device 102 is registered which the electronic device 101 receives from the control server 108-1 does not include content indicating that the external electronic device 102 is the device registered in the control application, the electronic device 101 may transfer the information about the external electronic device 102 to the purchase server 108-3.

In operation 913, the purchase server 108-3 may generate purchase-related information related to the external electronic device 102 based on the information about the external electronic device 102. In operation 914, the purchase server 108-3 may transmit the generated purchase-related information related to the external electronic device 102 to the electronic device 101. The purchase-related information may be purchase-related information about the external electronic device 102 itself or purchase-related information about a product related to the external electronic device 102.

In operation 915, the electronic device 101 may display third information including the purchase-related information related to the external electronic device 102 received from the purchase server 108-3. The third information may include a purchase screen which is generated for purchase at least one of the external electronic device 102 or a product related to the external electronic device 102 via the payment application, or a payment screen which is generated for confirming a product purchase and proceeding with payment.

Figure 10:
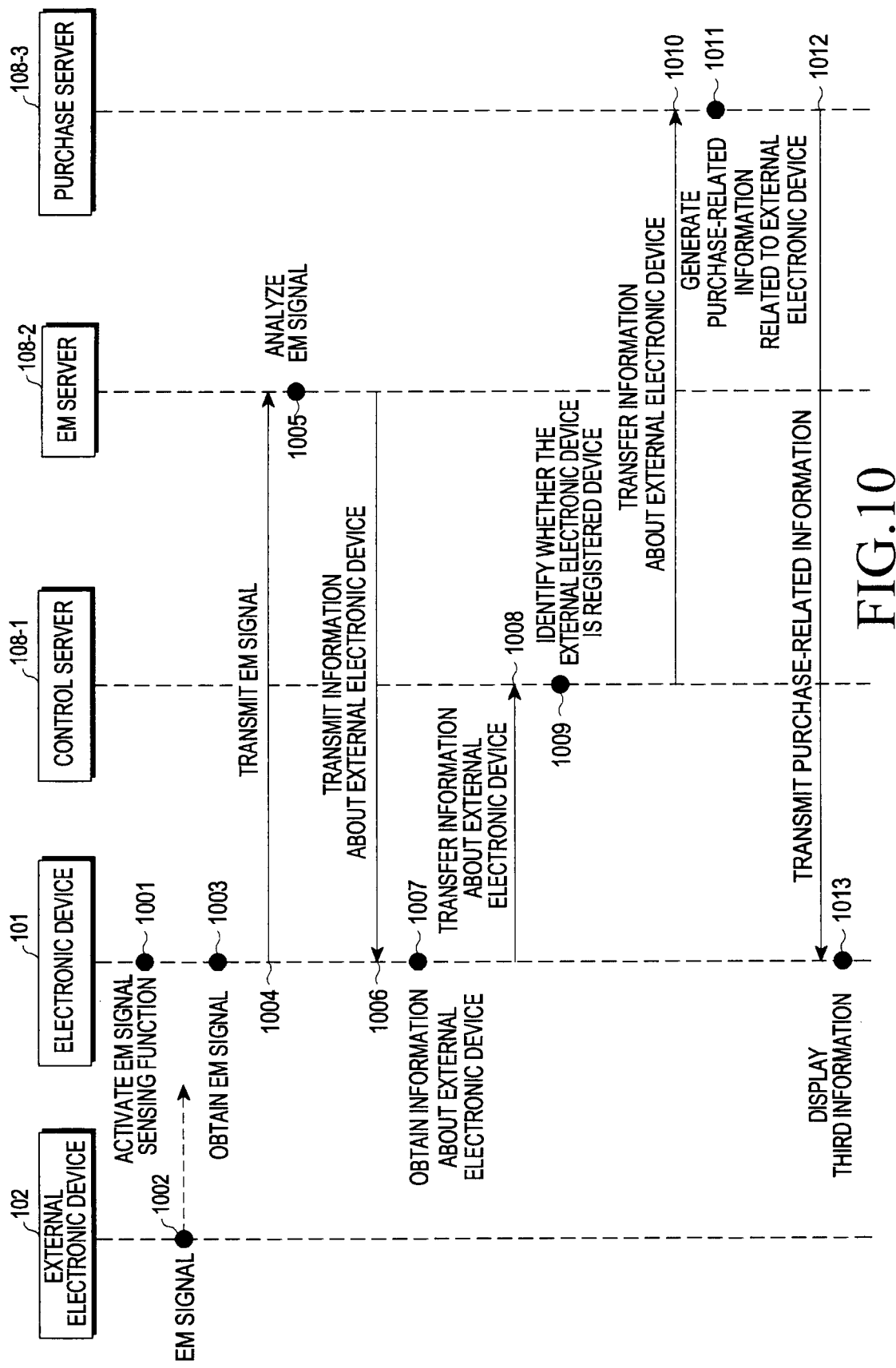
FIG. 10 is a flowchart illustrating a service providing procedure for an external electronic device in an electronic device according to various embodiments of the present invention.

FIG. 10 is a flowchart illustrating a service providing procedure for an external electronic device in an electronic device according to various embodiments of the present invention. In FIG. 10, an electronic device 101 may communicate with an external electronic device 102, a control server 108-1, an EM server 108-2, or a purchase server 108-3 via a second network 199 in FIG. 1. If the electronic device 101 is located within a designated distance from an external electronic device 104 with which the electronic device 101 may communicate via the second network 199, the electronic device 101 may operate for the external electronic device 104 to correspond to the external electronic device 102.

Referring to FIG. 10, the control server 108-1 and the purchase server 108-3 may directly transmit and receive data without passing through the electronic device 101. Operations 1001 to 1007 illustrated in FIG. 10 may be performed corresponding to all or some of operations 701 to 710 in FIG. 7. The electronic device 101 may transfer information about the external electronic device 102 to the control server 108-1 in operation 1008. In operation 1009, the control server 108-1 may identify whether the external electronic device 102 is a device registered in the designated control application based on the information about the external electronic device 102. In operation 1010, if the control server 108-1 identifies that the external electronic device 102 is not the device registered in the designated control application, the control server 108-1 may transfer, to the purchase server 108-3, the information about the external electronic device 102 received from the electronic device 101. The information about the external electronic device 102 is information which is identified via EM signal analysis of the EM server 108-2, and may include at least one of a type, a model name, account information, current state information of the external electronic device 102, or a location at which the EM signal is sensed.

In operation 1011, the purchase server 108-3 may generate purchase-related information related to the external electronic device 102 based on the information about the external electronic device 102. In operation 1012, the purchase server 108-3 may transmit the generated purchase-related information related to the external electronic device 102 to the electronic device 101. In operation 1013, the electronic device 101 may display third information including the purchase-related information related to the external electronic device 102 received from the purchase server 108-3. For example, the third information may include a purchase screen which is generated for purchase at least one of the external electronic device 102 or a product related to the external electronic device 102 via the payment application, or a payment screen which is generated for confirming a product purchase and proceeding with payment.

Figure 11:
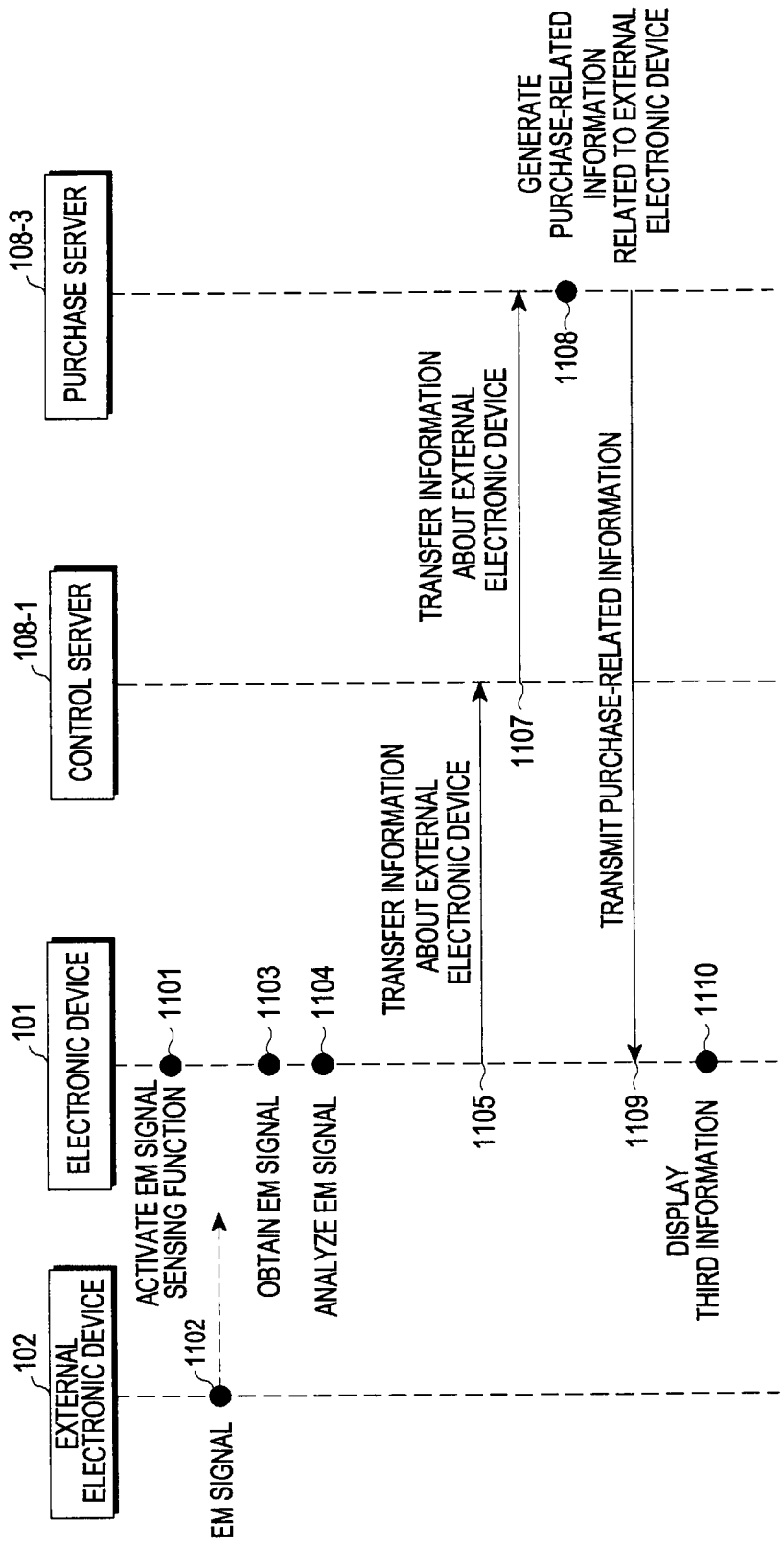
FIG. 11 is a flowchart illustrating a service providing procedure for an external electronic device in an electronic device according to various embodiments of the present invention.

FIG. 11 is a flowchart illustrating a service providing procedure for an external electronic device in an electronic device according to various embodiments of the present invention. In FIG. 11, an electronic device 101 may communicate with an external electronic device 102, a control server 108-1, or a purchase server 108-3 via a second network 199 in FIG. 1. If the electronic device 101 is located within a designated distance from an external electronic device 104 with which the electronic device 101 may communicate via the second network 199, the electronic device 101 may operate for the external electronic device 104 to correspond to the external electronic device 102.

Referring to FIG. 11, in operation 1101, the electronic device 101 may activate an EM signal sensing function. The EM signal sensing function may be always activated when the electronic device 101 is used, however, according to various embodiments, the EM signal sensing function may be set to be activated only if a corresponding function is required to prevent current consumption or malfunction. For example, the EM signal sensing function may be activated if a designated control application (e.g., Samsung Connect™, SmartThings™, or Bixby™, or Pay™) is run on the electronic device 101, or if one or more conditions (e.g., on/off switching of a display of the electronic device 101, a user's input, a designated location or time, or a connection to a specific device) designated by the user are satisfied. After being activated, the EM signal sensing function may be automatically deactivated again according to at least one condition (e.g., on/off switching of the display, the user's additional input, departure from the designated location, elapse of the designated time, disconnection from the specific device).

In operation 1102, the external electronic device 102 may generate an EM signal. For example, the EM signal may be a frequency signal due to EM interference generated from electronic components in the external electronic device 102, and include a type of the external electronic device 102, a sensing location in the external electronic device 102, or a frequency characteristic which is unique according to a current state of the external electronic device 102.

In operation 1103, the electronic device 101 may approach the external electronic device 102 to obtain the EM signal. For example, the EM signal may be obtained by using the EM signal sensing function activated in operation 1101.

In operation 1104, the electronic device 101 may analyze the EM signal. According to various embodiments of the present invention, the electronic device 1101 may include a classifier having a function of identifying a model name for the external electronic device 102, and identify information about the external electronic device 102 by using the classifier. The classifier may identify external electronic devices 310, 320, and 330 which correspond to the extracted EM signal by referring to a frequency table which is stored in a memory (e.g., a memory 130 in FIG. 1), and the information about the external electronic device 102 may include at least one of a type, a model name, account information, and current state information of the external electronic device 102, or a location at which the EM signal is sensed in the external electronic device 102.

In operation 1105, the electronic device 101 may transfer the information about the external electronic device 102 which is identified via the EM signal analysis to the control server 108-1. The control server 108-1 may be a server of the control application (e.g., Samsung Connect™, SmartThings™, or Bixby™) installed in the electronic device 101. If there is a specific application being run on the electronic device 101, the information about the external electronic device 102 may be transferred to a server related to the corresponding application, and if there is no specific application being run, the information about the external electronic device 102 may be transferred to a server of a designated control application.

In operation 1106, the control server 108-1 may identify whether the external electronic device 102 is a device registered in a designated control application based on the information about the external electronic device 102. For example, whether the external electronic device 102 is the device registered in the designated control application may be determined according to whether the electronic device 101 has a history that the electronic device 101 has been communicatively connected to the external electronic device 102. If the control server 108-1 identifies that the external electronic device 102 is the device registered in the designated control application, the control server 108-1 may transfer the identification result to the electronic device 101, and the electronic device 101 may display first information about control for the external electronic device 102. The first information may include a control screen of the external electronic device 102 registered in the control application.

If it is impossible to identify that the external electronic device 102 is the device registered in the designated control application according to the identification result of the control server 108-1, in operation 1107, the control server 108-1 may transfer the identification result to the purchase server 108-3.

According to various embodiments of the present invention, the electronic device 101 may receive a list of external electronic devices which are registered in the control application in advance from the control server 108-1 and store the list of external electronic devices. In this case, the electronic device 101 may directly identify whether the external electronic device 102 is the device registered in the control application, operation 1105 may be omitted, and operations 1106 and 1107 may be performed in the electronic device 101.

In operation 1108, the purchase server 108-3 may generate purchase-related information related to the external electronic device 102 based on the information about the external electronic device 102. In operation 1109, the purchase server 108-3 may transmit the generated purchase-related information related to the external electronic device 102 to the electronic device 101. The purchase-related information may be purchase-related information about the external electronic device 102 itself or purchase-related information about a product related to the external electronic device 102.

In operation 1110, the electronic device 101 may display third information including the purchase-related information related to the external electronic device 102 received from the purchase server 108-3. The third information may include a purchase screen which is generated for purchase at least one of the external electronic device 102 or a product related to the external electronic device 102 via the payment application, or a payment screen which is generated for confirming a product purchase and proceeding with payment.

Figure 12:
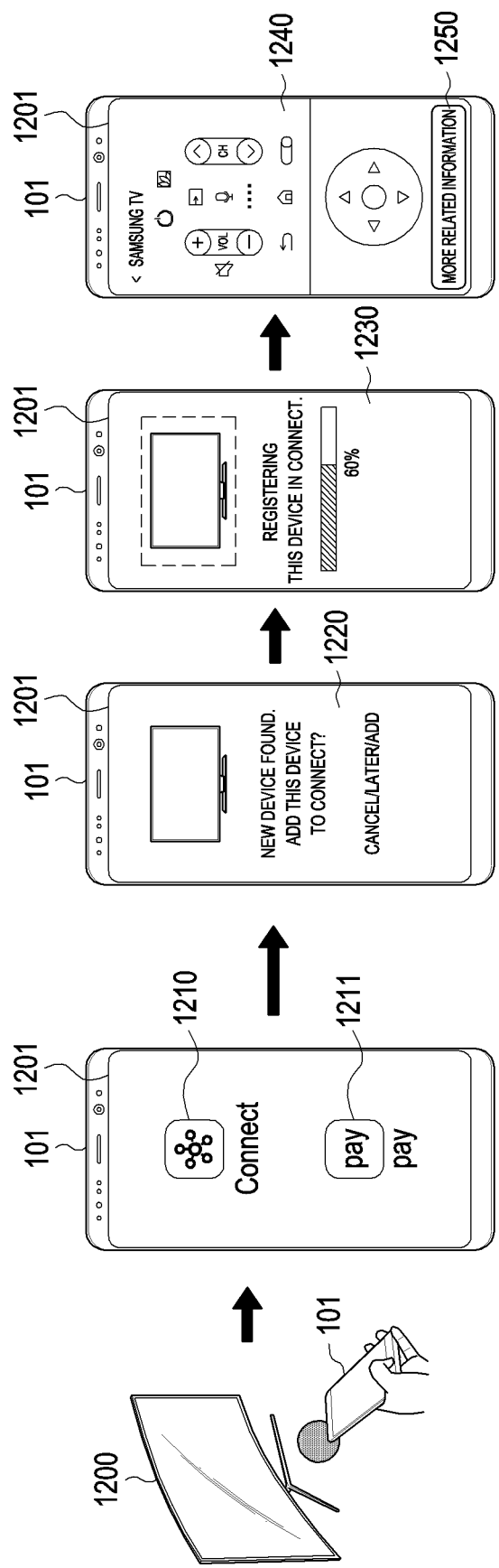
FIG. 12 is a diagram illustrating an example of an operation of controlling an external electronic device by sensing an EM signal according to various embodiments of the present invention.

FIG. 12 is a diagram illustrating an example of an operation of controlling an external electronic device by sensing an EM signal according to various embodiments of the present invention.

Referring to FIG. 12, an electronic device 101 may be in contact with a TV 1200 or approach the TV 1200 within a determined distance and then sense an EM signal generated in the TV 1200. If the EM signal is sensed, the electronic device 101 may display information 1210 and 1211 capable of selecting at least one of designated applications (e.g., Samsung Connect™, SmartThings™, Bixby™, and Pay™) on a display 1201. According to various embodiments of the present invention, the information for the selection may not be displayed if the designated application is automatically run according to sensing of the EM signal, or if one or more conditions designated by a user are satisfied and the designated application is run.

If a designated control application 1210 is run on the electronic device 101, the electronic device 101 may identify whether the TV 1200 is a device registered in the designated control application 1210 based on the EM signal, and then provide information for controlling the TV. For example, the electronic device 101 may identify whether the TV 1200 is the device registered in the designated control application 1210 via comparison with information in an EM signal frequency table stored in a memory 130 or based on information received from an EM server 108-2. If it is identified that the TV 1200 is not registered in the control application 1210, the electronic device 101 may provide information 1220 and 1230 for registering the TV 1200 in the control application 1210, and provide information 1240 capable of controlling the TV 1200 via the control application 1210 after a registration procedure is completed.

If it is identified that the TV 1200 is the device registered in the control application 1210, the electronic device 101 may directly provide information 1240 capable of controlling the TV 1200 via the control application 1210 without providing the information 1220 and 1230 about the registration. The electronic device 101 may display a menu 1250 capable of additionally providing information related to the TV 1200 at a bottom of the display 1201 in addition to the information 1240 capable of controlling the TV 1200. If the menu 1250 is selected by a user, product description information about the TV 1200, environment information around the TV 1200, or purchase-related information related to the TV 1200 may be additionally displayed.

Figure 13:
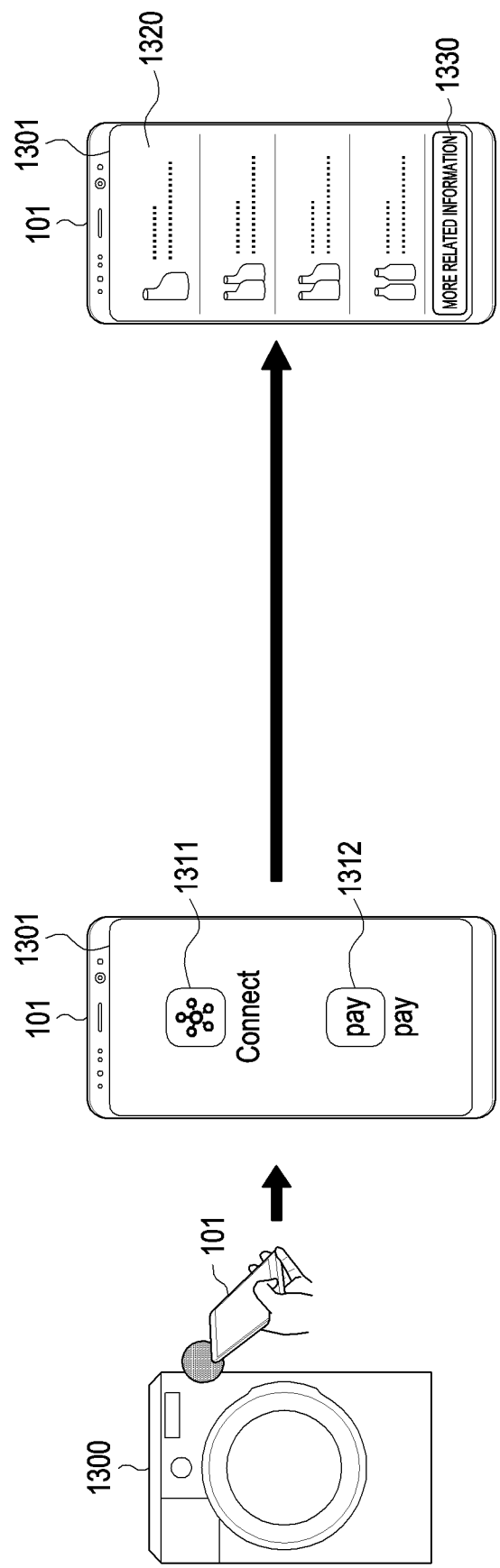
FIG. 13 is a diagram illustrating an example of an operation of making a purchase related to an external electronic device by sensing an EM signal according to various embodiments of the present invention.

FIG. 13 is a diagram illustrating an example of an operation of making a purchase related to an external electronic device by sensing an EM signal according to various embodiments of the present invention.

Referring to FIG. 13, an electronic device 101 may be in contact with a washing machine 1300 or approach the washing machine 1300 within a determined distance and then sense an EM signal generated in the washing machine 1300. If the EM signal is sensed, the electronic device 101 may display information 1311 and 1312 capable of selecting at least one of designated applications (e.g., Samsung Connect™, SmartThings™, Bixby™, or Pay™) on a display 1301. According to various embodiments of the present invention, the information for the selection may not be displayed if the designated application is automatically run according to sensing of the EM signal, or if one or more conditions designated by a user are satisfied and the designated application is run.

If a designated payment application 1312 is run on the electronic device 101, the electronic device 101 may provide purchase-related information 1320 related to the washing machine 1300. According to various embodiments of the present invention, if the electronic device 101 provides the purchase-related information 1320 via a payment application 1310 on a display 1301, the electronic device 101 may display only price comparison information, or may additionally display information for proceeding with a purchase or payment in addition to the price comparison information. For example, if there is biometric information (e.g., a fingerprint, an iris, a face, a vein, a voice, or a signature) registered in the payment application 1312, a payment function may be provided by using a payment means included in the payment application 1312 after user authentication via matching with biometric information inputted from a user. If there is no biometric information registered in the payment application 1312, shopping information or a product purchase route related to a purchase target product may be provided.

According to various embodiments of the present invention, the purchase-related information 1320 may be configured by considering various items such as a location of the electronic device 101, whether the electronic device 101 has been already connected to the washing machine 1300, whether an account is registered, or a location at which the EM signal is sensed in the purchase-related information 1320. For example, if the electronic device 101 senses an EM signal of a washing machine in an electronics store, the electronic device 101 may provide price information of a corresponding washing machine model, and if the electronic device 101 senses an EM signal of a washing machine which has been already connected to the electronic device 101 at home, the electronic device 101 may provide purchase-related information for laundry detergent. For another example, if the location at which the EM signal is sensed is on one side of a body of a washing machine, information about the washing machine itself may be provided, however, if the location at which the EM signal is sensed is the vicinity of a detergent inlet of the washing machine), purchase-related information for laundry detergent may be provided. In this case, the electronic device 101 may display purchase-related information about laundry detergent which has been previously used in a washing machine identified by EM signal sensing. If a purchase for a product recognized by the EM signal sensing or provision of information about the product recognized by the EM signal sensing is impossible, the electronic device 101 may provide information about a similar product. The electronic device 101 may display a menu 1330 capable of additionally providing information related to the washing machine 1300 at a bottom of the display 1301 in addition to the purchase-related information 1320. If the menu 1330 is selected by a user, control-related information for the washing machine 1300 may be additionally displayed.

Figure 14A:
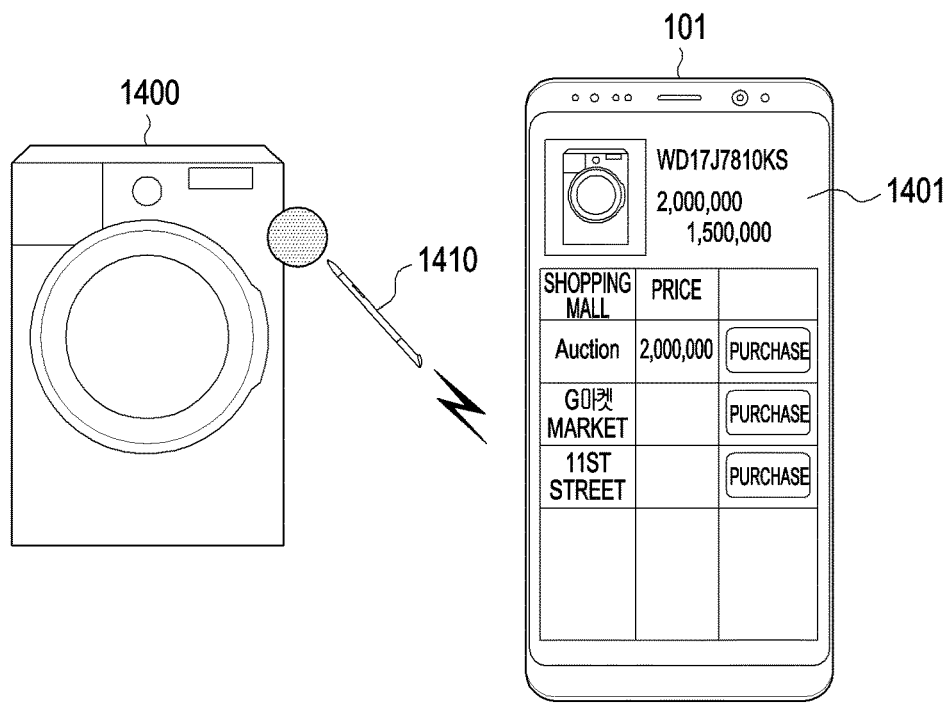
FIG. 14a is a diagram illustrating an example of an operation of providing a service for an external electronic device by using an accessory of an electronic device according to various embodiments of the present invention.

FIG. 14*a* is a diagram illustrating an example of an operation of providing a service for an external electronic device by using an accessory of an electronic device according to various embodiments of the present invention. If there is an external accessory 1410 capable of communicating with an electronic device 101, an EM signal generated from an external electronic device may be sensed via the accessory 1410, and information related to the external electronic device may be provided via the electronic device 101.

Referring to FIG. 14*a*, an EM signal generated from a washing machine 1400 may be sensed by using the accessory 1410 which is communicatively connected to the electronic device 101. The accessory 1410 may include a bluetooth low energy (BLE) pen or a tag device provided together with the electronic device 101. Information 1401 related to the washing machine 1400 from which the EM signal is sensed by the accessory 1410 may be provided via a screen of the electronic device 101. The information 1401 related to the washing machine 1400 may include at least one of information related to control of the washing machine 1400 or purchase-related information related to the washing machine 1400, and may be generated in consideration of various items such as a function being executed in the electronic device 101, a location of the electronic device 101, a location at which the EM signal is sensed from the washing machine 1400, or a previous connection record between the electronic device 101 and the washing machine 1400.

According to various embodiments of the present invention, the accessory 1410 having an EM signal sensing function may be used in a store which sells electronic products. For example, if a seller senses an EM signal of a target electronic product by using the accessory 1410, purchase-related information related to the corresponding electronic product may be displayed to a purchaser via the electronic device 101 capable of communicating with the accessory 1410. The purchase-related information may include at least one of a screen which displays price information of the corresponding electronic product, a purchase progress screen, or a screen for activating a payment function. If the accessory 1410 is connected to the purchaser's electronic device, the purchase-related information about the product from which the EM signal is sensed by the accessory 1410 may be directly displayed on the purchaser's electronic device, and a purchase or payment procedure may be directly made via the purchaser's electronic device. Store information that the purchaser has visited, purchase-related promotion information, or information for contacting the seller may be provided to the purchaser via the purchaser's electronic device in addition to the purchase-related information about the electronic product recognized by the EM signal sensing.

Figure 14B:
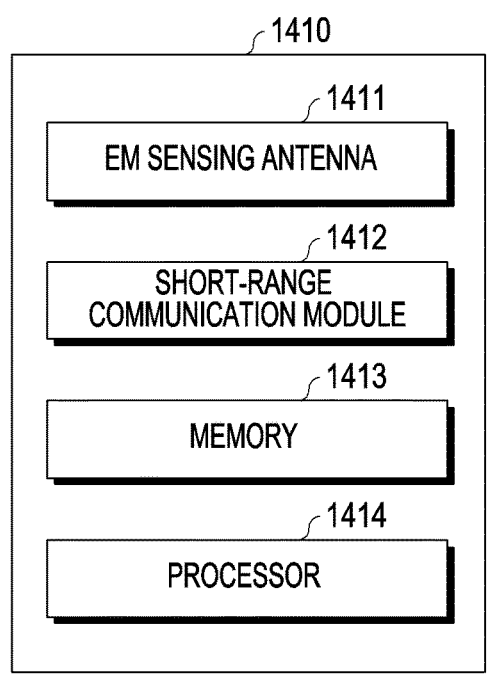
FIG. 14b is a block diagram illustrating an accessory of an electronic device according to various embodiments of the present invention.

FIG. 14*b* is a block diagram illustrating an accessory 1410 having an EM signal sensing function according to various embodiments of the present invention. Referring to FIG. 14*b*, the accessory 1410 may include an EM sensing antenna 1411, a short-range communication module 1412, a memory 1413, or a processor 1414.

According to various embodiments of the present invention, the EM sensing antenna 1411 may sense an EM signal generated from an external electronic device (e.g., a washing machine 1400). The short-range communication module 1412 may support a communication with an electronic device 101 communicatively connected to the accessory 1410.

The memory 1413 may store instructions which, when executed, control the processor 1414 to perform various operations. For example, if the accessory 1410 is in contact with the external electronic device (e.g., the washing machine 1400) or approaches the external electronic device (e.g., the washing machine 1400) within a determined distance, the processor 1414 may activate an EM signal sensing function of the EM sensing antenna 1411 to control to obtain an EM signal from the external electronic device (e.g., the washing machine 1400). The processor 1414 may control to transfer the sensed EM signal to the electronic device 101 via the short-range communication module 1412. The electronic device 101 receiving the EM signal from the accessory 1410 may include all or some of components in FIG. 4*a*, and may provide information related to the external electronic device (e.g., the washing machine 1400).

Figure 15:
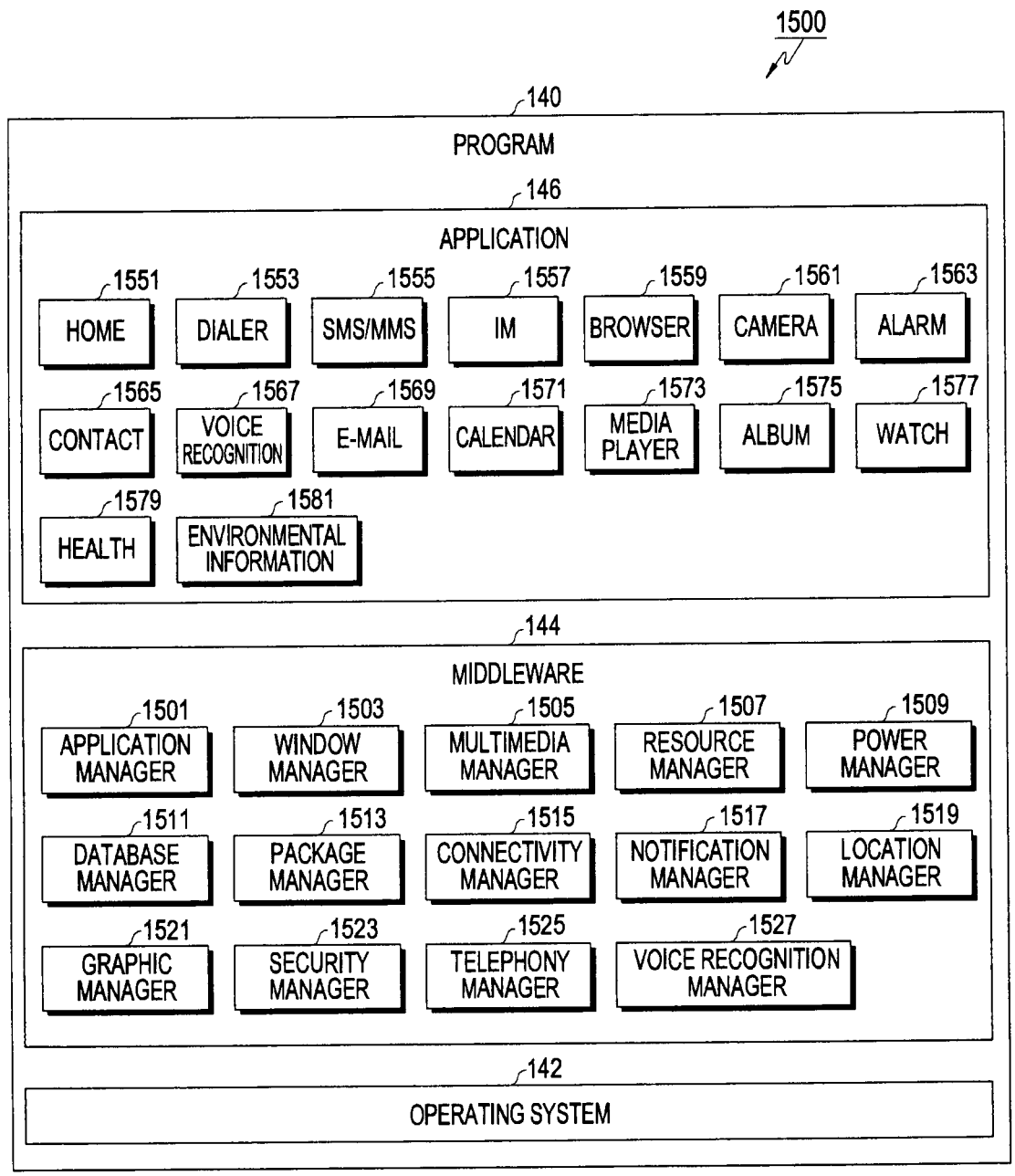
FIG. 15 is a block diagram illustrating a program according to various embodiments of the present invention.

FIG. 15 is a block diagram 1500 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 1501, a window manager 1503, a multimedia manager 1505, a resource manager 1507, a power manager 1509, a database manager 1511, a package manager 1513, a connectivity manager 1515, a notification manager 1517, a location manager 1519, a graphic manager 1521, a security manager 1523, a telephony manager 1525, or a voice recognition manager 1527.

The application manager 1501, for example, may manage the life cycle of the application 146. The window manager 1503, for example, may manage one or more graphical user interface (GUI) resources that are used on a screen. The multimedia manager 1505, for example, may identify one or more formats to be used to play media files, and may encode or decode a corresponding one of the media files using a codec appropriate for a corresponding format selected from the one or more formats. The resource manager 1507, for example, may manage the source code of the application 146 or a memory space of the memory 130. The power manager 1509, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 1509 may interwork with a basic input/output system (BIOS) (not shown) of the electronic device 101.

The database manager 1511, for example, may generate, search, or change a database to be used by the application 146. The package manager 1513, for example, may manage installation or update of an application that is distributed in the form of a package file. The connectivity manager 1515, for example, may manage a wireless connection or a direct connection between the electronic device 101 and the external electronic device. The notification manager 1517, for example, may provide a function to notify a user of an occurrence of a specified event (e.g., an incoming call, message, or alert). The location manager 1519, for example, may manage locational information on the electronic device 101. The graphic manager 1521, for example, may manage one or more graphic effects to be offered to a user or a user interface related to the one or more graphic effects.

The security manager 1523, for example, may provide system security or user authentication. The telephony manager 1525, for example, may manage a voice call function or a video call function provided by the electronic device 101. The voice recognition manager 1527, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 1544 may dynamically delete some existing components or add new components. According to an embodiment, at least part of the middleware 144 may be included as part of the OS 142 or may be implemented as another software separate from the OS 142.

The application 146 may include, for example, a home 1551, dialer 1553, short message service (SMS)/multimedia messaging service (MMS) 1555, instant message (IM) 1557, browser 1559, camera 1561, alarm 1563, contact 1565, voice recognition 1567, email 1569, calendar 1571, media player 1573, album 1575, watch 1577, health 1579 (e.g., for measuring the degree of workout or biometric information, such as blood sugar), or environmental information 1581 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 1569) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device 160 or a camera module 180 of the external electronic device). The device management application, additionally or alternatively, may support installation, delete, or update of an application running on the external electronic device.

Each of components described in various embodiments of the present invention may include one or more parts, and a name of a corresponding component may vary with a type of an electronic device. In various embodiments of the present invention, the electronic device may include at least one of components described in this document, omit some of them, or include other additional component(s). Some of the components of the electronic device according to various embodiments may be combined into an entity, but the entity may perform the same functions as the components may perform.

The term "module" used in this document may refer to a unit including one of hardware, software, and firmware, or a combination of two or more of the hardware, software, and firmware. The term "module" may be interchangeably used with, e.g., a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic devices which perform some operations, which have already been known or will be developed in the future.

According to various embodiments, at least a part of a device (e.g., modules or their functions) or method (e.g., operations) may be implemented as an instruction stored in computer-readable storage media, e.g., in a form of a program module. The instruction, when executed by a processor (e.g., a processor 120 in FIG. 1), may enable the one or more processors to perform a function which corresponds to the instruction. The computer-readable storage media may be, e.g., a memory (e.g., a memory 130 in FIG. 1).

The computer-readable storage media may include a hard disc, a floppy disc, magnetic media (e.g., a magnetic tape), optical media (e.g., a compact disc read only memory (CD-ROM), a digital versatile disc (DVD), and magneto-optical media (e.g., a floptical disk)), and a hardware device (e.g., a read only memory (ROM), a random access memory (RAM), or a flash memory). Further, a program command may include not only a machine language code but also a high-level language code which is executable by a computer by using an interpreter. The aforementioned hardware device may be configured to operate as one or more software modules to perform operations in various embodiments, and vice versa.

A module or a program module according to various embodiments may include at least one or more of the aforementioned components, omit some of them, or further include other additional components. Operations performed by a module, a program module or other components according to various embodiments may be executed sequentially, simultaneously, repeatedly, or heuristically. Furthermore, some of the operations may be executed in a different order, or omitted, or include other additional operation(s).

A storage medium according to various embodiments may store instructions, and the instructions, when executed by at least one processor, may be set to cause the at least one processor to perform at least one operation, and the at least one operation may include an operation of sensing an electromagnetic (EM) signal genenarted from the external electronic device, an operation of requesting, from a server, information which corresponds to the sensed EM signal, an operation of receiving, from the server, information about the external electronic device in response to the request, an operation of identifying whether the external electronic device is registered in a designated control application based on the received information about the external electronic device, and an operation of providing information related to the external electronic device based on whether the external electronic device is registered which are included in a method for controlling the external electronic device in an electronic device.

A storage medium according to various embodiments may store instructions, and the instructions, when executed by at least one processor, may be set to cause the at least one processor to perform at least one operation, and the at least one operation may include an operation of running a designated payment application, an operation of sensing an electromagnetic (EM) signal generated from the external electronic device, an operation of requesting, from a server, information which corresponds to the sensed EM signal, an operation of receiving, from the server, information about the external electronic device in response to the request, an operation of identifying purchase-related information related to the external electronic device based on the received information about the external electronic device, and an operation of providing the purchase-related information related to the external electronic device which are included in a method for controlling the external electronic device included in a method for providing a purchase service related to the external electronic device in an electronic device.

Embodiments disclosed in this document are proposed for description and understanding of a technology disclosed in this document and does not limit the scope of the technology disclosed in this document. Accordingly, the scope of this document should be interpreted as including all changes or various embodiments which are based on the technical spirit of this document.

What is claimed is:

1. An electronic device, comprising:
   an antenna module configured to sense an electromagnetic (EM) signal generated from an external electronic device;
   a communication module;
   a processor operatively connected to the antenna module and the communication module; and
   a memory storing instructions which, are configured to, when executed, cause the processor to:
   identify the external electronic device based on at least part of the EM signal detected from the external electronic device via the antenna module,
   identify whether the identified external electronic device is registered in a designated control application, and
   based on identifying the external electronic device being registered in the designated control application, display first information related to remote control of the external electronic device on a display of the electronic device,
   wherein the instructions are configured to cause the processor to additionally provide third information about a purchase related to the external electronic device based on information about the external electronic device if it is identified that the external electronic device is not registered in the designated control application.

2. The electronic device of claim 1, wherein the instructions are configured to cause the processor to obtain the EM signal from the external electronic device by activating an E M signal sensing function of the antenna module if at least one designated condition is satisfied.

3. The electronic device of claim 1, wherein the instructions are configured to cause the processor to request identification information which corresponds to the EM signal from a server via the communication module, and identify the external electronic device based on identification information about the external electronic device received from the server in response to the request, and
   wherein the identification information about the external electronic device includes at least one of a device type of the external electronic device, a model name of the external electronic device, account information of the external electronic device, current state information of the external electronic device, or a location at which the EM signal is sensed, which are analyzed based on the EM signal.

4. The electronic device of claim 1,
   wherein the first information includes a control screen capable of controlling the external electronic device via the designated control application.

5. The electronic device of claim 1, wherein the instructions are configured to cause the processor to provide second information about registration of the external electronic device if it is identified that the external electronic device is not registered in the designated control application, and
   wherein the second information includes a registration screen which is generated for connecting the external electronic device to the designated control application and registering the external electronic device in the designated control application.

6. A method for controlling an external electronic device in an electronic device, the method comprising:
   sensing an electromagnetic (EM) signal generated from an external electronic device;
   identifying, via at least one processor, the external electronic device based on at least part of the EM signal sensed from the external electronic device;
   identifying whether the identified external electronic device is registered in a designated control application;
   in response to identifying the external electronic device is registered in the designated control application, displaying first information related to remote control of the external electronic device on a display of the electronic device; and
   additionally providing third information about a purchase related to the external electronic device based on information about the external electronic device if it is identified that the external electronic device is not registered in the designated control application.

7. The method of claim 6, further comprising: obtaining the EM signal from the external electronic device by activating an EM signal sensing function of an antenna module if at least one designated condition is satisfied.

8. The method of claim 6, wherein identifying the external electronic device comprises:
   requesting information which corresponds to the EM signal from a server via a communication module; and
   identifying the external electronic device based on information about the external electronic device received from the server in response to the request, and
   wherein the information about the external electronic device includes at least one of a device type of the external electronic device, a model name of the external electronic device, account information of the external electronic device, current state information of the external electronic device, or a location at which the EM signal is sensed, which are analyzed based on the EM signal.

9. The method of claim 6,
   wherein the first information includes a control screen capable of controlling the external electronic device via the designated control application.

10. The method of claim 6, further comprising:
    providing second information about registration of the external electronic device if it is identified that the external electronic device is not registered in the designated control application, and
    wherein the second information includes a registration screen which is generated for connecting the external electronic device to the designated control application and registering the external electronic device in the designated control application.

* * * * *